US006661774B1

(12) United States Patent
Lauffenburger et al.

(10) Patent No.: US 6,661,774 B1
(45) Date of Patent: Dec. 9, 2003

(54) SYSTEM AND METHOD FOR TRAFFIC SHAPING PACKET-BASED SIGNALS

(75) Inventors: Kenneth A. Lauffenburger, Carrollton, TX (US); Al Whaley, Palo Alto, CA (US); Klaus S. Fosmark, Plano, TX (US); William A. Perry, Jr., Addison, TX (US); Charles F. Shelor, Arlington, TX (US)

(73) Assignee: Efficient Networks, Inc., Dallas, TX (US)

(*) Notice: Subject to any disclaimer, the term of this patent is extended or adjusted under 35 U.S.C. 154(b) by 0 days.

(21) Appl. No.: 09/251,105

(22) Filed: Feb. 16, 1999

(51) Int. Cl.[7] .......................... G01R 31/08; G06F 11/00; G08C 15/00; H04J 1/16; H04J 3/14; H04L 1/00; H04L 12/26; H04L 12/66; H04L 12/28; H04L 12/56

(52) U.S. Cl. .................. 370/230.1; 370/352; 370/395.2; 370/412

(58) Field of Search .................. 370/229, 230, 370/230.1, 231, 232, 235, 239.1, 236, 389, 395.1, 399.21, 395.4, 395.41, 395.42, 252, 395.2, 412

(56) References Cited

U.S. PATENT DOCUMENTS

| | | | |
|---|---|---|---|
| 5,231,631 A | 7/1993 | Buhrke et al. | 370/230 |
| 5,274,768 A | 12/1993 | Traw et al. | 704/236 |
| 5,280,476 A | 1/1994 | Kojima et al. | 370/397 |
| 5,311,509 A | 5/1994 | Heddes et al. | 370/397 |
| 5,379,297 A | 1/1995 | Glover et al. | 370/234 |
| 5,381,411 A | 1/1995 | Ohno et al. | 370/232 |
| 5,414,707 A | 5/1995 | Johnston et al. | 370/395.3 |
| 5,420,858 A | 5/1995 | Marshall et al. | 370/392 |
| 5,430,721 A | 7/1995 | Dumas et al. | 370/395.41 |
| 5,455,826 A | 10/1995 | Ozveren et al. | 370/232 |
| 5,490,141 A | 2/1996 | Lai et al. | 370/352 |
| 5,533,020 A * | 7/1996 | Byrn et al. | 370/395.4 |
| 5,535,197 A | 7/1996 | Cotton | 370/395.72 |

(List continued on next page.)

FOREIGN PATENT DOCUMENTS

| | | | |
|---|---|---|---|
| EP | 0130260 | 1/1985 | H04L/5/14 |
| EP | 0325794 | 12/1988 | H04Q/11/04 |
| WO | 9807282 | 4/1998 | |

OTHER PUBLICATIONS

"Traffic Management Specification Version 4.0" (af–tm–0056.000), *The ATM Forum Technical Committee*, Apr., 1996, 107 pages.
"Universal Serial Bus Class Definitions for Communication Devices," Version 1.1, *USB Implementers' Forum*, Jan. 19, 1999, 110 pages.
"ATM over ADSL Recommendations," *ADSL Forum Technical Report TR–002*, Mar. 1997, 23 pages.
"Framing and Encapulations Standards for ADSL: Packet Mode," *ADSL Forum WT–004 v3.0 Technical Report*, Mar. 1997, 16 pages.
Daniel Minoli and Michael Vitella, "ATM Cell Relay Service for Corporate Environments," *New York: McGraw–Hill, Inc.*, 1994.

*Primary Examiner*—Seema S. Rao
*Assistant Examiner*—Kevin C. Harper
(74) *Attorney, Agent, or Firm*—Baker Botts L.L.P.

(57) ABSTRACT

A method of scheduling transmission of a plurality of cells of a first signal packet associated with a first virtual channel address using a scheduling ring having a plurality of slots and pointer operable to indicate a current slot includes advancing the pointer to a slot associated with the first virtual channel address, initiating transmission of a previously scheduled first cell associated with the first virtual channel address, rescheduling transmission of a previously unscheduled second cell associated with the first virtual channel address for transmission at a later time, and advancing the pointer to the next slot.

44 Claims, 10 Drawing Sheets

U.S. PATENT DOCUMENTS

| | | | |
|---|---|---|---|
| 5,548,587 A | 8/1996 | Bailey et al. | 370/395.7 |
| 5,557,607 A | 9/1996 | Holden | 370/413 |
| 5,568,486 A | 10/1996 | Huscroft et al. | 370/395.2 |
| 5,572,522 A | 11/1996 | Calamvokis et al. | 370/390 |
| 5,579,312 A * | 11/1996 | Regache | 370/397 |
| 5,583,861 A | 12/1996 | Holden | 370/395.42 |
| 5,592,476 A | 1/1997 | Calamvokis et al. | 370/390 |
| 5,600,650 A | 2/1997 | Oskouy | 370/468 |
| 5,602,853 A | 2/1997 | Ben-Michael et al. | 370/474 |
| 5,617,416 A | 4/1997 | Damien | 370/391 |
| 5,625,625 A | 4/1997 | Oskouy et al. | 370/395.4 |
| 5,629,937 A | 5/1997 | Hayter et al. | 370/233 |
| 5,701,292 A | 12/1997 | Chiussi et al. | 370/232 |
| 5,726,985 A | 3/1998 | Daniel et al. | 370/382 |
| 5,732,087 A | 3/1998 | Lauer et al. | 370/416 |
| 5,742,765 A | 4/1998 | Wong et al. | 713/200 |
| 5,745,477 A | 4/1998 | Zeng et al. | 370/230 |
| 5,751,709 A * | 5/1998 | Rathnavelu | 370/395.4 |
| 5,787,086 A | 7/1998 | McClure et al. | 370/413 |
| 5,835,494 A * | 11/1998 | Hughes et al. | 370/232 |
| 5,844,890 A * | 12/1998 | Delp et al. | 370/230 |
| 5,852,655 A | 12/1998 | McHale et al. | 379/93.14 |
| 5,870,628 A | 2/1999 | Chen et al. | 710/22 |
| 5,889,779 A * | 3/1999 | Lincoln | 370/398 |
| 5,968,128 A | 10/1999 | Lauck et al. | 709/232 |
| 5,983,279 A | 11/1999 | Lin et al. | 709/235 |
| 5,991,867 A * | 11/1999 | Fosmark | 370/230 |
| 6,018,527 A * | 1/2000 | Yin et al. | 370/395.41 |
| 6,028,843 A * | 2/2000 | Delp et al. | 370/230.1 |
| 6,041,059 A * | 3/2000 | Joffe et al. | 370/412 |

* cited by examiner

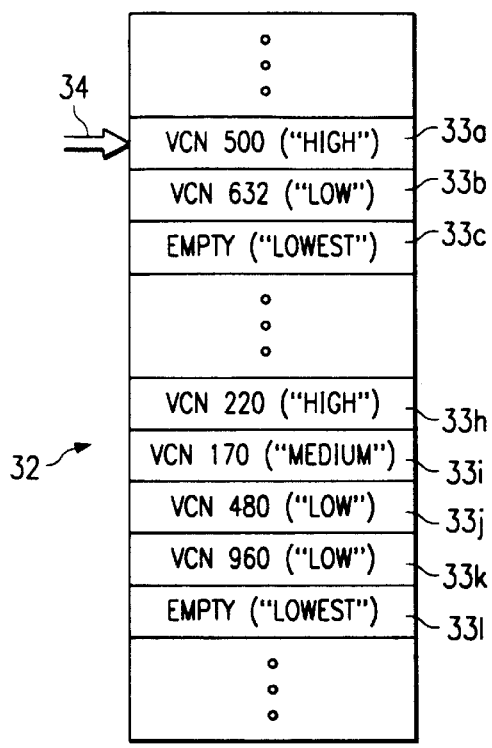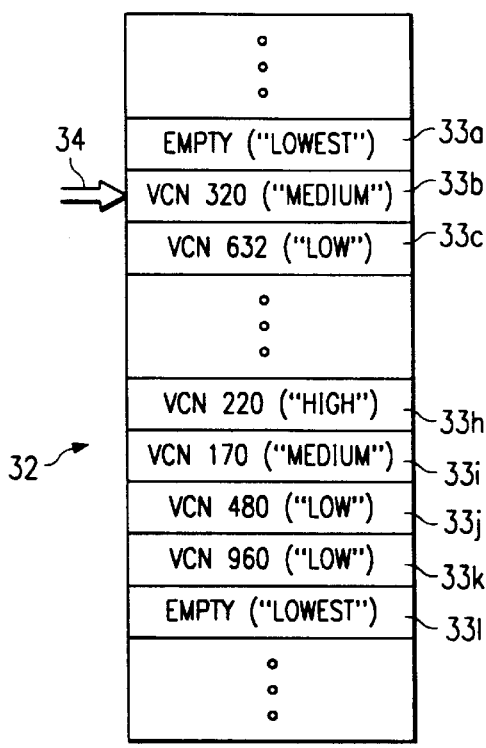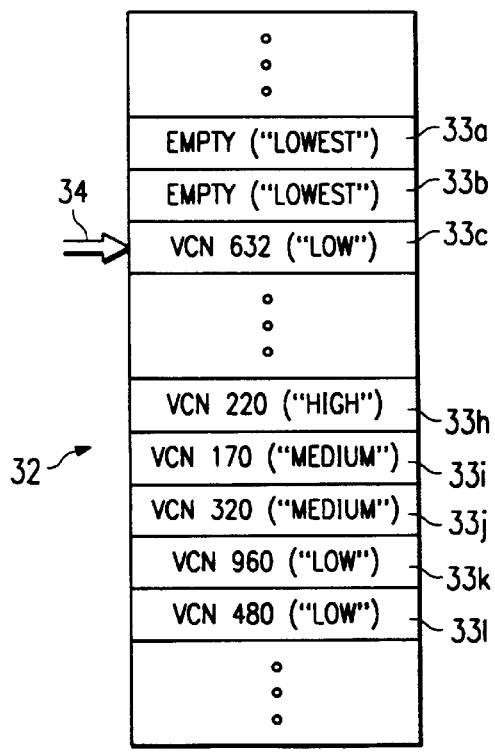

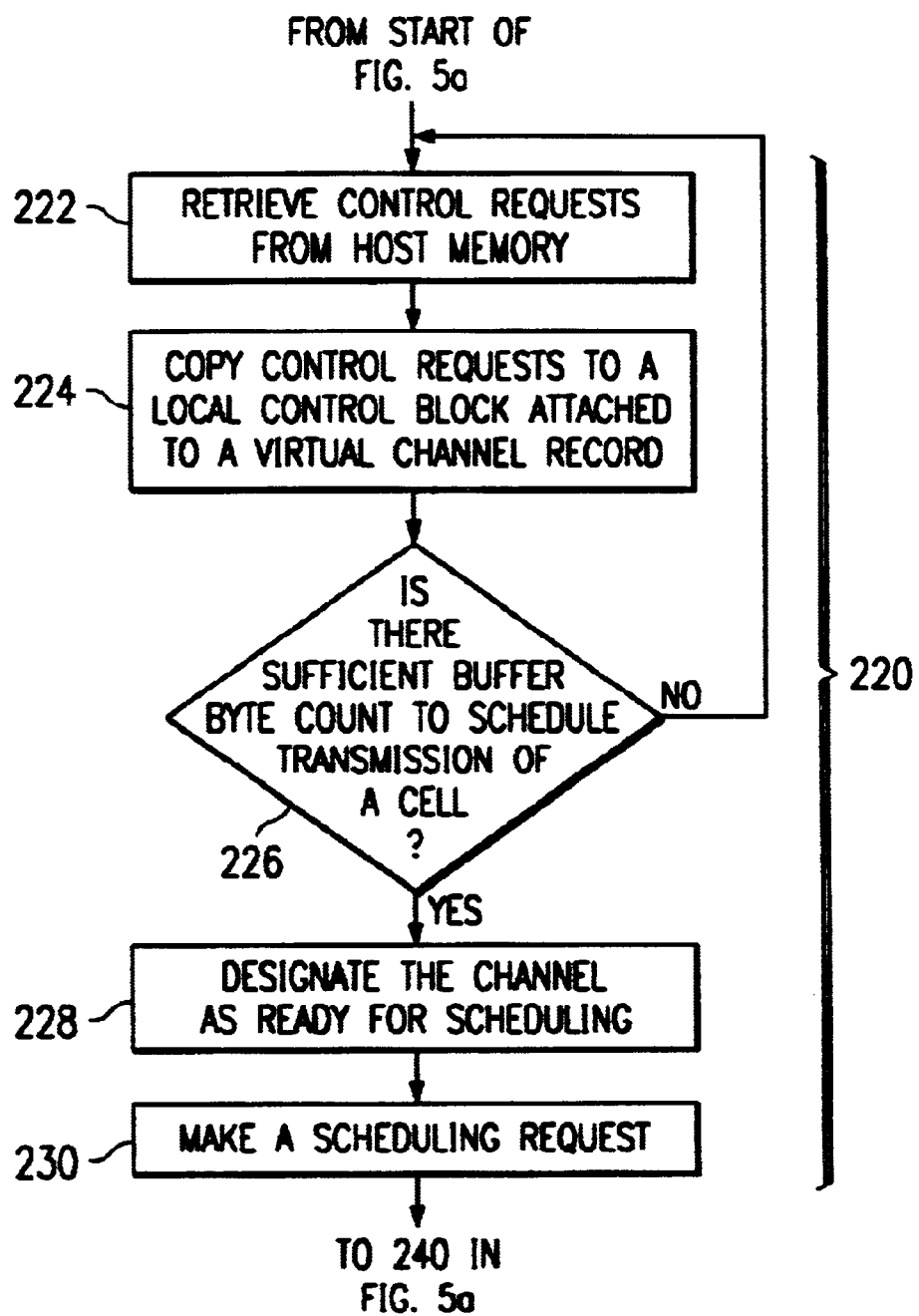

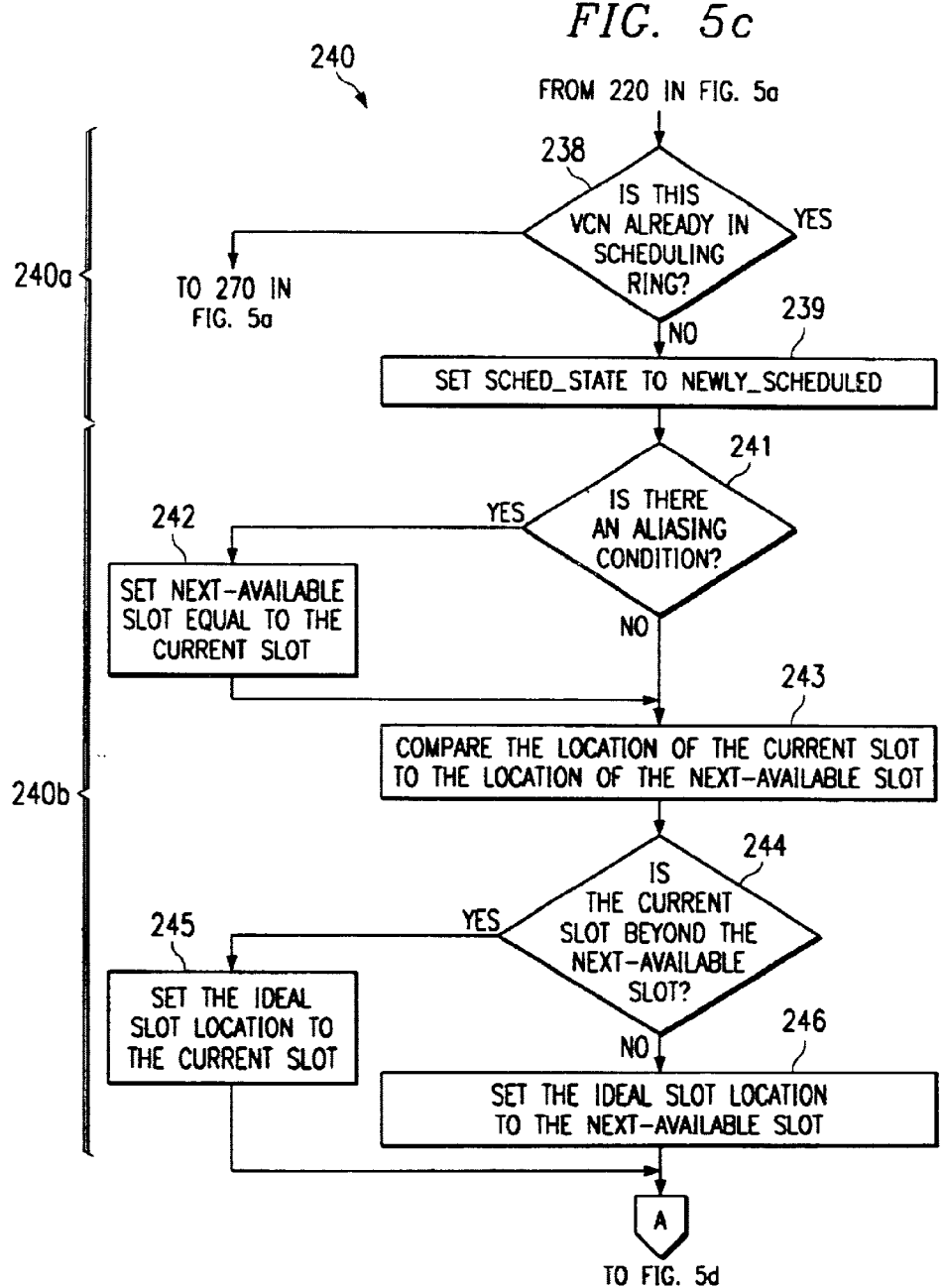

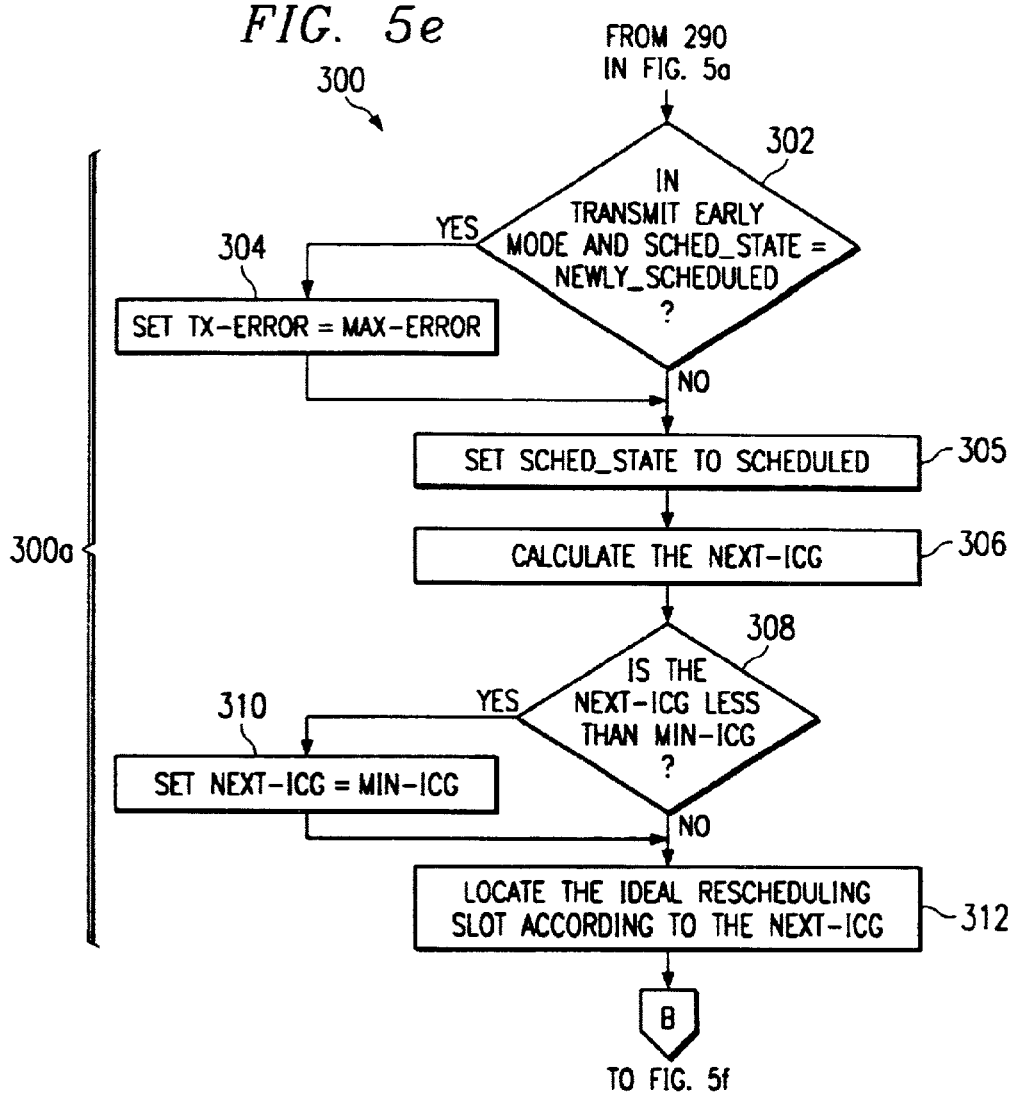

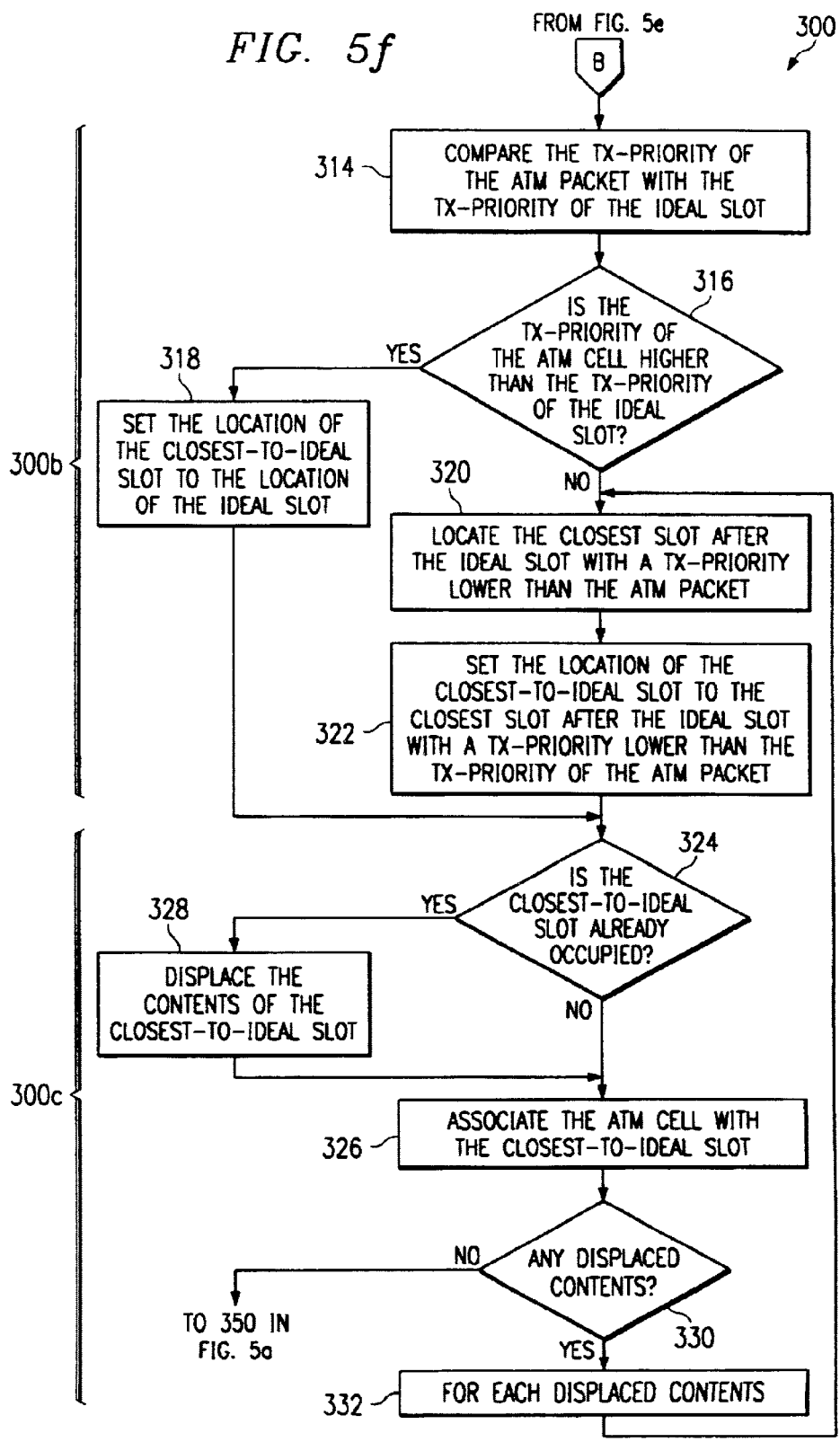

SYSTEM AND METHOD FOR TRAFFIC SHAPING PACKET-BASED SIGNALS

CROSS-REFERENCE TO RELATED APPLICATIONS

This application is related to pending U.S. patent application Ser. No. 09/251,107, entitled "Data Transmission System and Method of Operation," and pending U.S. patent application Ser. No. 09/251,110, entitled "System and Method for Prefetching Data;" both applications filed concurrently with this application.

TECHNICAL FIELD OF THE INVENTION

The present invention relates to the field of communication systems, and more particularly to a system and method for traffic shaping packet-based signals.

BACKGROUND OF THE INVENTION

Communications systems capable of processing packet-based signals, such as asynchronous transfer mode (ATM) or frame relay signals, may transmit, receive and process various types of information, such as voice, video, data, etc. These various signal types have different characteristics and place different demands on the transmission system. For example, packets supporting constant bit rate (CBR) signals, such as video signals, require a continuous flow of data transmitted at a constant rate. CBR signals tolerate little deviation in transmission rates before the quality of the signal degrades. Other types of signals, such as, available bit rate (ABR) signals typically exhibit bursty traffic patterns involving sporadic transmission of blocks of cells. ABR signals generally allow greater flexibility in the timing of their transmission.

Designers of systems for transmitting packet-based signals face a challenge of providing economical systems for efficiently transmitting signals supporting various qualities of service. A key to facilitating efficient transmission of various types of signals is to maintain an even transmission distribution to avoid idle transmission time. One approach to scheduling transmission of various packet-based signals is to use a transmission scheduling queue having a ring structure, wherein all cells, or frames of a particular packet are simultaneously scheduled in the ring. This approach schedules a first cell in an appropriate location within the ring, and then proceeds to schedule all other cells from the same packet based on the position of the initially scheduled cell. A problem with this approach is that it does not allow for adjustment of the ring's contents once the packet has been scheduled. Subsequently received packets in need of transmission may be precluded from entry into the ring because of the static. nature of the scheduling method.

SUMMARY OF THE INVENTION

In accordance with the present invention, a system and method for traffic shaping packet-based signals are provided that substantially eliminate or reduce disadvantages or problems associated with previously developed systems and methods. In particular, the present invention facilitates traffic shaping signal packets to provide an efficient distribution of transmitted signals in light of the quality of service (QOS) associated with each signal.

In one embodiment of the present invention, a method of scheduling transmission of a plurality of cells of a first signal packet associated with a first virtual channel address using a scheduling ring having a plurality of slots and pointer operable to indicate a current slot, comprises advancing the pointer to a slot associated with the first virtual channel address, initiating transmission of a previously scheduled first cell associated with the first virtual channel address, rescheduling transmission of a previously unscheduled second cell associated with the first virtual channel address for transmission at a later time, and advancing the pointer to the next slot.

Technical advantages of the present invention include the provision of a method and apparatus for traffic shaping transmission of a plurality of signal packets to provide an efficient transmission distribution in light of the quality of service associated with each packet. The present invention dynamically schedules each cell in a packet near or during the time that a previously scheduled cell of that packet is serviced for transmission. This system avoids problems associated with statically allocated transmission schedules by facilitating constant reorganization of the scheduling ring as new cells are scheduled.

The invention associates each signal packet with a particular transmission priority based on characteristics associated with each packet. The present invention schedules transmission of the cells of each packet based, at least in part, on the cell's transmission priority relative to transmission priorities associated with previously scheduled cells. Assigning a transmission priority to each virtual channel scheduled in the scheduling ring facilitates displacement of lower priority scheduling events and reorganization of the transmission schedule to ensure that the highest priority transmission events occur in a timely fashion.

The invention provides an efficient method and apparatus for quickly locating an appropriate location in the scheduling ring for scheduling transmission of a cell, without methodically traversing every slot of the scheduling ring. A priority map of the present invention provides an advantage of minimizing read and write accesses to memory structures within the system.

The invention also provides an advantage of facilitating a variable transmission rate by controlling the inter-cell gap associated with each packet depending on a constantly monitored accumulated transmission error associated with each packet. To increase resolution and maintain precision control of the transmission rate, the present invention tracks the transmission error and inter-cell gaps using floating point mathematics. This facilitates tracking of fractional transmission errors, which may otherwise go unreported. By continuously accounting for even fractional transmission errors incurred in servicing previously transmitted cells, the present invention provides a significant advantage of maintaining a close to ideal transmission rate and eliminates the need for additional resynchronization functionality.

The present invention further provides an effective method and apparatus for controlling and maintaining the system's cell delay variation tolerance through a variety of mechanisms.

BRIEF DESCRIPTION OF THE DRAWINGS

For a more complete understanding of the present invention, and for further features and advantages thereof, reference is now made to the following description taken in conjunction with the accompanying drawings, in which:

FIG. 2 is a block diagram of an exemplary scheduling ring constructed according to the teachings of the present invention;

FIGS. 5a–5f are flow charts illustrating an exemplary method of scheduling and rescheduling transmission of a plurality of cells of a signal packet according to the teachings of the present invention.

DETAILED DESCRIPTION OF THE INVENTION

Figure 1:
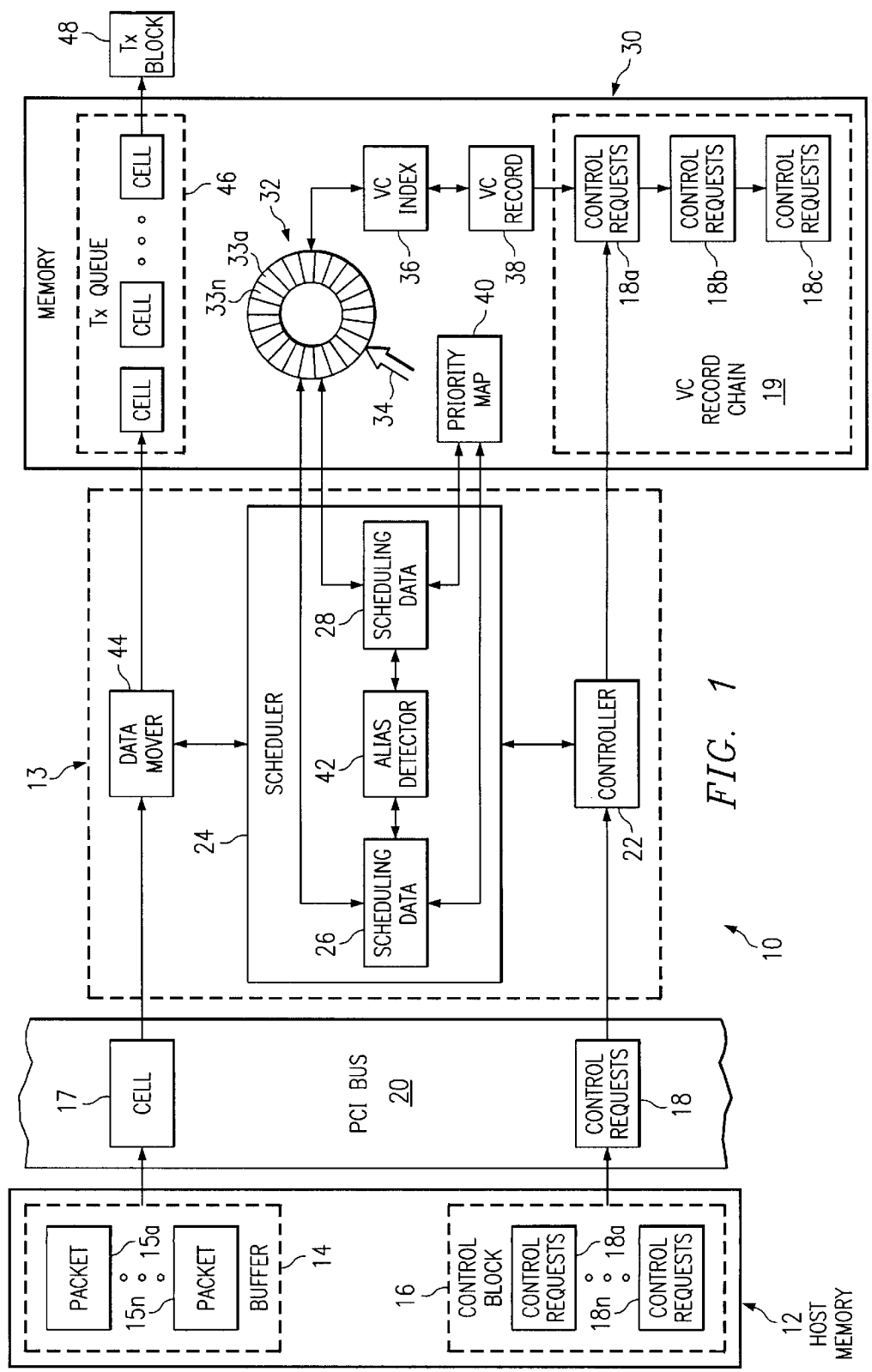
FIG. 1 is a block diagram of a system for traffic shaping the transmission of signal packets according to the teachings of the present invention.

FIG. 1 is a block diagram of a system for traffic shaping the transmission of signal packets according to the teachings of the present invention. In general, system 10 operates to receive a plurality of signal packets and to manage transmission of the packets to various network elements. System 10 may process and transmit any packet-based signal format. In the illustrated embodiment, system 10 schedules asynchronous transfer mode (ATM) packets for transmission. System 10 may, alternatively, process other signal formats, such as frame relay, without departing from the scope of the invention.

System 10 may comprise a host memory 12; which includes a plurality of host data buffers 14. Each host data buffer 14 may hold one or more packets 15a–15n, each packet 15 containing a block of data that may be segmented into one or more cells 17. Throughout this document, the term 'cell' refers generally to a subset of the larger signal packets 15. In this embodiment, cells 17 comprise ATM cells, each having a fixed length, or number of bits per cell. Cells 17 may, alternatively, comprise another subset or division of a packet. For example, where packets 15 follow the frame relay format, each cell 17 could comprise a variable length frame. Throughout this description, the subparts of each packet will be denoted as "cells." It should be noted that the term "cell" is broad enough to encompass other packet subsets, such as variable length frames.

Host memory 12 may also include a control block 16 comprising a plurality of control requests 18 for instructing system 10 on the scheduling of transmission of signal packets 15. Host memory 12 communicates with other system elements through a peripheral component interconnect (PCI) bus 20. Although the illustrated embodiment defines local bus 20 as a PCI bus, any communication link operable to provide an interface between host memory 12 and other system components may be used. System 10 further includes a scheduling control module, which communicates with host memory 12 via PCI bus 20. Scheduling control module 13 includes a scheduler 24 coupled to a controller 22 and a data mover 44.

Controller 22 operates to manage control requests 18 received from host memory 12 over PCI bus 20. Controller 22 receives control requests 18, and formulates scheduling requests, which are passed to a scheduler 24. Scheduler 24 receives scheduling requests from controller 22 and schedules transmission of a cell associated with control request 18 according to the cell's priority relative to other cells awaiting transmission. Scheduler 24 includes a scheduling module 26 and a rescheduling module 28. Scheduling modules 26 and 28 interact with various scheduling elements residing in a memory 30 of system 10 to facilitate scheduling of cells 17. Although the illustrated embodiment shows scheduling module 26 and rescheduling module 28 as separate entities, these modules could alternatively be combined into a single entity capable of performing both scheduling and rescheduling functions.

Memory 30 may include a scheduling ring 32 comprising a plurality of slots 33a–33n, referred to generally as slots 33. Each slot 33 of scheduling ring 32 may hold or be associated with a virtual channel number along with various information associated with that virtual channel number. Each virtual channel number identifies a unique virtual channel operable to process transmission of a cell.

In this embodiment, scheduling ring 32 comprises 4,096 slots, each slot holding a unique virtual channel number corresponding to one of 4,096 virtual channels serviced by system 10. Each slot 33 of scheduling ring 32 may hold various data useful in the scheduling process, along with pointers to data structures holding additional data related to the virtual channel corresponding to that slot. For example, each virtual channel number has an associated entry in a virtual channel index table 36 and an associated virtual channel record 38. Virtual channel index table 36 and virtual channel record 38 each contain additional information defining transmission characteristics of the virtual channel associated with that particular virtual channel number.

Memory 30 may further comprise a scheduling ring pointer 34. Scheduling ring pointer 34 points to a slot corresponding to the virtual channel currently being serviced. In the illustrated embodiment, scheduling ring pointer 34 comprises a 24-bit wide pointer, which increments by one slot each time service is complete with respect to the current virtual channel.

Although the illustrated embodiment defines scheduling ring 32 as a circular list implementing a pointer to the current position being serviced, any data structure operable to store a transmission schedule for various virtual channels according to their relative priorities, and to continuously reorganize the contents of the data structure upon addition of new transmission events may be implemented without departing from the scope of the invention.

Memory 30 may further comprise a priority map 40. Priority map 40 comprises a data structure for storing, organizing, and facilitating retrieval of transmission priorities associated with each virtual channel. In the illustrated embodiment, priority map 40 comprises a three level 16-way tree structure. Although the illustrated embodiment describes a particular structure for priority map 40, other structures, arrangements, and compilations of data may be implemented without departing from the scope of the invention. Additional details of the structure and function of priority map 40 will be described below.

Scheduling module 26 and rescheduling module 28 may access priority map 40 in determining appropriate placement of a scheduling request in scheduling ring 32. Scheduling module 26 and rescheduling module 28 may also access an alias detector 42. Because the present invention implements a circular list in managing scheduling requests, and scheduling ring pointer comprises a finite number of bits with which it may uniquely identify a particular slot at a particular instance in time, alias detector 42 is advantageous in ensuring the temporal integrity of certain data stored in scheduling ring 32. Details of the function of alias detector 42 will be described below.

System 10 further includes a data mover 44, which interacts with scheduler 24 to service the current virtual channel. Scheduling ring pointer 34 always points to a slot 33 associated with the virtual channel currently being scheduled. The incrementing of scheduling ring pointer 34 signals data mover 44 to begin servicing the virtual channel associated with the slot 33 corresponding to the current position of scheduling ring pointer 34.

In servicing the current virtual channel, data mover 44 accesses either a prefetch queue or host memory 12 to retrieve particular cells 17 associated with the current virtual channel scheduled for transmission. Data mover 44 retrieves cells 17 from PCI bus 20 or the prefetch queue and places them on a transmission queue 46 stored within memory 30. In the illustrated embodiment, transmission queue 46 comprises a first-in-first-out (FIFO) data structure. Cells 17 are sequentially removed from transmission queue 46 and transmitted to various network elements through transmission block 48.

In the embodiment shown in FIG. 1, host memory 12, PCI bus 20, scheduling control module 13, and memory 30 are shown as separate entities. For example, host memory 12 may comprise a dynamic random access memory structure, scheduling control module 13 may comprise an application specific integrated circuit (ASIC), and memory 30 may comprise a static random access memory (SRAM). Alternatively, all or a part of memory 30, scheduling control module 13, PCI bus 20, and/or host memory 12 may exist as part of a single ASIC. The illustrated embodiment is only one example of a possible configuration. Other combinations and subcombinations of components residing on various ASICs and chip sets could be used without departing from the scope of the invention. In addition, although the illustrated embodiment shows the use of an ASIC, various elements and processes could be implemented in software, hardware, firmware, or any combination of software, hardware, and firmware.

Although the operation of system 10 will be described in detail below, a brief overview of system 10's operation will now be given. Initially, a plurality of data packets 15 reside within data buffers 14 contained in host memory 12. Data packets 15 will be segmented into ATM cells 17 for transmission to various other network elements. Each data packet 15 is associated with a virtual channel that will ultimately service the transmission of cells 17 within the packet 15. Control requests 18, which are associated with data packets 15, also reside within host memory 12, and are stored in control buffers 16. Control requests 18 contain instructions on scheduling transmission of associated cells 17. Each control request 18 is associated with one or more data packets 15 that are to be transmitted on a single virtual channel.

Controller 22 initiates the scheduling process by retrieving individual control requests 18 from host memory 12 over PCI bus 20, and transferring the request into memory 30. Each control request is linked into a chain attached to a virtual channel record 38 of the virtual channel to which the control request is associated. As control requests are linked onto each virtual channel-record chain 19, buffer byte counts are accumulated and stored in an associated virtual channel record 38. When the accumulated byte count for a buffer reaches some predetermined threshold, such as an accumulated byte count of one cell, controller 22 designates the associated virtual channel as ready for scheduling and initiates a scheduling request to scheduler 26.

For an initial scheduling request of a new packet 15, scheduling module 26 begins by determining an ideal scheduling slot within scheduling ring 32 for scheduling transmission of a first cell 17a of packet 15. The ideal scheduling slot represents a location in scheduling ring 32 with which first cell 17a should be associated to maintain an ideal or desired transmission rate. Scheduler 26 determines the ideal scheduling slot based, in part, on an inter-cell gap associated with that cell. Upon determining the ideal scheduling slot, scheduler 26 accesses priority map 40 to identify a closest-to-ideal scheduling slot based on a transmission priority associated with first cell 17a relative to transmission priorities associated with various scheduling slots 33. The closest-to-ideal scheduling slot represents a location in scheduling ring 32 that is nearest to (either at or after) the ideal scheduling slot, and having a lower transmission priority than first cell 17a.

In some cases, the ideal scheduling slot will be unoccupied, or occupied, but associated with a packet having a lower transmission priority than the packet 15 to be scheduled. In those cases, the closest-to-ideal scheduling slot is at the ideal scheduling slot. In other cases, however, the ideal scheduling slot may already be associated with a packet having the same or a higher transmission priority than the packet 15 to be scheduled. In that case, first cell 17a must be scheduled in the next closest slot after the ideal scheduling slot, which has a lower transmission priority than cell 17a. Once the closest-to-ideal scheduling slot has been identified, scheduling module 26 associates the virtual channel number corresponding to first cell 17a with the identified closest-to-ideal scheduling slot. This step may involve displacing virtual channel numbers corresponding to previously scheduled or rescheduled lower transmission priority cells and reorganization of scheduling ring 32.

Once associated with a slot within scheduling ring 32, first cell 17a awaits transmission. The virtual channel associated with first cell 17a will be serviced when scheduling ring pointer 34 arrives at the scheduling slot 33 associated with first cell 17a. Prior to scheduling ring pointer 34 advancing to this position, first cell 17a may itself be displaced by higher transmission priority cells and reassigned a later scheduling slot 33.

As scheduling ring pointer 34 reaches scheduling slot 33 associated with first cell 17a, data mover 44 services the virtual channel associated with that slot. In doing so, data mover 44 may access a prefetch queue to retrieve first cell 17a. Alternatively, if first cell 17a is not present within the prefetch queue, data mover 44 may retrieve it from host memory 12 using PCI bus 20. In either case, data mover 44 retrieves the scheduled cell and places it onto transmission queue 46, where it awaits transmission.

In servicing of the virtual channel associated with the current slot, controller 22 determines whether there is sufficient byte count within local control queue 19 to warrant a rescheduling operation. If so, rescheduling module 28 proceeds to reschedule transmission of a second cell 17b from the same packet 15. The rescheduling operation may occur before, during or shortly after system 10 services the virtual channel associated with the current slot. If rescheduling occurs after servicing, it preferably occurs prior to advancing scheduling pointer 34 to the next slot.

In performing the rescheduling operation, rescheduling module 28 first determines an ideal rescheduling slot within scheduling ring 32. The ideal rescheduling slot is determined by an inter-cell gap and a transmission error associated with the current cell. The inter-cell gap and transmission error identify an appropriate number of slots residing between the previously scheduled cell of that packet and the cell being scheduled.

Upon locating the ideal rescheduling slot, rescheduling module 28 accesses priority map 40 to determine a closest-to-ideal rescheduling slot. Rescheduling module 28 identifies the closest-to-ideal rescheduling slot by comparing the transmission priority associated with second cell 17b to transmission priorities associated with various slots in scheduling ring 32. The closest-to-ideal rescheduling slot is defined as the closest slot at or after the ideal rescheduling slot having a lower transmission priority than second cell 17b. As in the scheduling process, this determination may involve displacing and reorganizing data within scheduling ring 32 where the identified closest-to-ideal rescheduling slot is already associated with a previously scheduled or rescheduled lower transmission priority cell.

The present invention continuously reorganizes the scheduling ring as new cells are scheduled and rescheduled for transmission, and tracks transmission error associated with each cell (i.e., the difference between the actual scheduling time and the ideal scheduling time). By scheduling transmission of cells based on their relative priorities and continuously accounting for transmission error incurred while servicing previously transmitted cells, the present invention provides a significant advantage of facilitating efficient traffic shaping of transmission of cells supporting various qualities of service.

FIGS. 2a–2c are block diagrams showing a portion of scheduling ring 32 at various points in the scheduling/rescheduling process. FIG. 2a shows a portion of scheduling ring 32 during a scheduling request. By way of example, scheduler 26 may receive instructions to schedule transmission of a first cell 17a, which has a "medium" transmission priority and is associated with virtual channel number 320. Scheduler 26 may begin by identifying an ideal scheduling slot for first cell 17a. In this case, slot 33a is identified as the ideal scheduling slot. Scheduler 26 then accesses priority map 40 to identify a closest-to-ideal scheduling slot (i.e., the closest slot at or after ideal slot 33a having a lower transmission priority than first cell 17a).

In this example, ideal scheduling slot 33a is already occupied by virtual channel number 500, which corresponds to a "high" priority previously scheduled cell. The ideal scheduling slot being unavailable, scheduling module 26 traverses priority map 40 to locate the closest slot 33 after the ideal slot 33a having a lower transmission priority than first cell 17a. In this example, slot 33b is occupied by virtual channel number 632, which corresponds to a "low" priority cell. Since slot 33b is the closest slot after the unavailable ideal scheduling slot 33a having a lower priority than first cell 17a, slot 33b is designated as the closest-to-ideal scheduling slot.

Scheduling module 26 proceeds by displacing the lower priority contents of closest-to-ideal scheduling slot 33b, and associating first cell 17a with that slot. Scheduling module 26 then accesses priority map 40 to locate a reinsertion slot in scheduling ring 32 for the lower priority displaced contents. The reinsertion slot is the first slot after the slot from which the contents were displaced, which has a lower priority than the displaced contents. In this example, slot 33c is an unoccupied slot (having the lowest priority) into which scheduling module 26 may reinsert the lower priority displaced contents from slot 33b. Details of displacement and reorganization of data within scheduling ring 32 will be described in detail below.

FIG. 2b shows a portion of scheduling ring 32 after virtual channel number 500 has been serviced, first cell 17a has been associated with closest-to-ideal scheduling slot 33b, and the displaced contents of slot 33b have been reinserted in slot 33c. After servicing virtual channel number 500, scheduling ring pointer 34 advances to slot 33b, corresponding to virtual channel number 320, which is associated with first cell 17a. Scheduler 24 proceeds to service virtual channel number 320. In servicing virtual channel 320 associated with the current slot 33b, data mover 44 retrieves first cell 17a and places it in a transmission queue for transmission. In addition, rescheduling module 28 determines that there exists sufficient buffer byte count to warrant a rescheduling operation. As previously discussed, rescheduling module may operate prior to, during, or after data mover 44 retrieves first cell 17a for transmission.

In providing its rescheduling function, rescheduling module 28 proceeds to identify an ideal rescheduling slot; in this case, slot 33h. Rescheduling module next accesses priority map 40 to identify a closest-to-ideal rescheduling slot. In this case, ideal rescheduling slot 33h is unavailable because it is already occupied by virtual channel number 220 corresponding to a previously scheduled or rescheduled cell having a higher priority than second cell 17b. The next slot 33i is also unavailable, because it is already occupied by virtual channel number 170 corresponding to a previously scheduled cell having the same priority as second cell 17a. Rescheduling module 28 finally identifies slot 33j (holding virtual channel number 480) as the closest-to-ideal rescheduling slot comprising the closest slot at or after the ideal rescheduling slot having a lower transmission priority than second cell 17b.

Rescheduling module 28 displaces the lower priority contents of closest-to-ideal rescheduling slot 33j, and associates second cell 17b with that slot. Rescheduling module 28 then accesses priority map 40 to locate a reinsertion slot in scheduling ring 32 for the lower priority displaced contents. The reinsertion slot is the first slot after the slot from which the contents were displaced, which has a lower priority than the displaced contents. In this example, slot 33l is an unoccupied slot (having the lowest priority) into which rescheduling module 28 may reinsert the lower priority displaced contents from slot 33j.

FIG. 2c is a block diagram showing a portion of scheduling ring 32 after first cell 17a has been serviced, second cell 17b has been associated with closest-to-ideal rescheduling slot 33j, and the displaced contents from slot 33j have been reinserted into previously unoccupied slot 33l.

Figure 3:
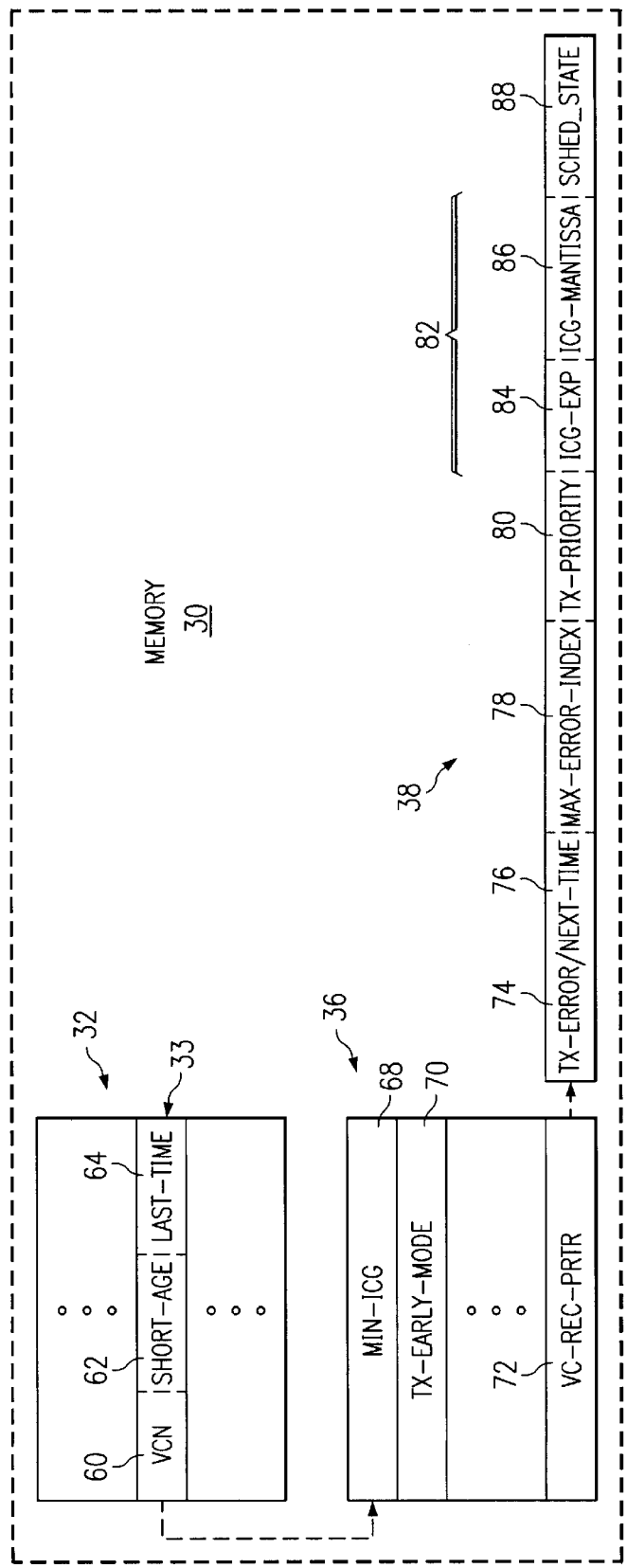
FIG. 3 is a block diagram of a portion of a memory containing the scheduling ring and various data structures storing a plurality of transmission characteristics associated with cells being scheduled for transmission.

FIG. 3 is a block diagram of a portion of memory 30 containing scheduling ring 32 and various data structures storing a plurality of transmission characteristics associated with cells 17 being scheduled for transmission. As previously described, memory 30 includes scheduling ring 32 comprising a plurality of slots 33. In this embodiment, scheduling ring 32 comprises 4,096 slots, each containing various information associated with an associated virtual channel.

In the illustrated example, each slot 33 includes a virtual channel number (VCN) 60, which uniquely identifies a particular virtual channel associated with that slot. Each virtual channel number, or address, may appear only once in scheduling ring 32. Each slot 33 may also include various other information useful in scheduling transmission of cells over a virtual channel associated with that slot. For example, in this embodiment, each slot 33 includes a short-age value 62 and a last-time value 64.

Short-age value 62 is used in determining whether certain information associated with virtual channel number 60 remains valid in light of the circular structure of scheduling ring 32. In the illustrated embodiment, after scheduling transmission of a particular cell, scheduling ring pointer 34 may make one or more revolutions around scheduling ring 32 before that cell is actually serviced. This may occur, for example, because the scheduled cell has a low transmission priority, causing it to be bumped by higher transmission priority cells. Because the timing of servicing cells within scheduling ring 32 depends on the associated slot's relative location in the ring, it becomes desirable to track multiple revolutions of scheduling ring pointer 34.

In this embodiment, scheduling ring pointer 34 is 16-bits wide. Since scheduling ring 32 comprises 4,096 slots, scheduling ring pointer 34 has enough bits to uniquely identify up to sixteen revolutions of slots in scheduling ring 32. After the sixteenth revolution, the timing values last-time 64 and next-time 76 associated with a virtual channel number and last updated when that virtual channel number was last scheduled or rescheduled, will overflow the 16 bit ranges provided for them, aliasing smaller timing values and causing erroneous calculations. Scheduler 24 uses short-age value 62 as an indicator that scheduling ring pointer 34 may have circled scheduling ring 32 more than twelve times since the information associated with that slot has been stored, preventing potentially erroneous timing values from figuring in calculations. When shortage value 62 reaches a particular value after up to twelve revolutions, scheduler 24 invalidates particular stored values associated with that slot and uses alternative default values in making calculations for scheduling service of the virtual channel associated with that slot. Details of this anti-aliasing function will be further described below.

Last-time variable 64 is used to document the last time virtual channel number 60 was serviced. This information is useful in allowing scheduler 24 to determine whether cells are being scheduled on time, ahead of time, or behind a desired time defined by an inter-cell gap associated with virtual channel number 60. Deviations from ideal scheduling timing results in an accumulated transmission error. System 10 provides an advantage of compensating for transmission error by adjusting scheduling times of subsequent cells based, at least in part, on the transmission error incurred.

In the illustrated embodiment, each VCN has an associated entry in virtual channel index table 36. Virtual channel index table 36 comprises additional scheduling information, which is efficiently stored in a data structure separated from slot 33 and indexed on virtual channel number 60. For example, virtual channel index table 36 may store a minimum inter-cell gap (MIN-ICG) value 68. Minimum inter-cell gap value 68 identifies a minimum allowable number of cells between transmission of two cells of the same packet. Minimum inter-cell gap 68 limits the peak transmission rate of system 10 to ensure that system 10 does not overload the receivers of the transmitted cells. System 10 provides a unique method of maintaining a specified Cell Delay Variation Tolerance (CDVT) through manipulation of minimum inter-cell gap value 68.

Virtual channel index table 36 may also hold a transmit-early mode indicator 70. Transmit-early-mode indicator 70 determines whether system 10 will be allotted a transmission error credit during rescheduling. Generally, system 10 allows for adjustment to the desired inter-cell gap in light of accrued transmission error. System 10 may allot an error credit to provide an automatic rate adjustment for aggressive transmission. Details of the transmit-early-mode will be discussed later in this document. Virtual channel index table 36 may include various other scheduling information. The data values shown in virtual channel index table are meant for exemplary purposes only.

In addition to storing particular data values, virtual channel index table can further include virtual channel record pointer 72, which points to a virtual channel record 38 associated with virtual channel number 60. Information stored within virtual channel record 38 could, alternatively, be stored in virtual channel index table 36, or in slot 33. The illustrated embodiment provides one example of a method of indirectly associating information with virtual channel number 60 to provide an efficient use of memory 30.

Virtual channel record 38 comprises additional scheduling information, including but not limited to, a transmission error value 74, a next-time value 76, a maximum error index 78, a transmission priority 80, and an inter-cell gap 82. Transmission error value 74 comprises a value corresponding to a deviation from an ideal scheduling rate. Transmission error value 74 is used during the rescheduling process to compensate for error incurred during scheduling or previous rescheduling events. System 10 provides transmission error compensation by adjusting the desired value of the inter-cell gap in light of the accumulated transmission error value 74.

Next-time value 76 corresponds to the next time scheduling ring 32 should be allowed to schedule virtual channel number 60 in light of inter-cell gap 82 associated with virtual channel number 60. In the illustrated embodiment, transmit error value 74 and next-time value 76 share a common location in memory. This is possible because only one of the values is active at any one time. Either scheduling ring 32 is in a scheduling mode and next-time value 76 is in use, or scheduling ring 32 is in a rescheduling mode and transmit error value 74 is in use.

Maximum-error-index 78 indexes one of a plurality of maximum error values associated with scheduling ring 32. The maximum error value represents a maximum amount of transmission error accommodated by system 10. Any transmission error beyond the maximum allowable transmission error is discarded. The maximum error value, in combination with MIN-ICG parameter 68, provides for tuning of certain traffic shaping characteristics, including configuring cell transmission on a virtual channel to fall within a specified Cell Delay Variation Tolerance (CDVT).

In many cases, several virtual channel numbers will share a common maximum allowable error value. Rather than storing the same multi-bit value in multiple memory locations, the illustrated embodiment employs maximum error index 78 to index a plurality of registers containing possible maximum allowable error values. In this way, virtual channel numbers sharing a common maximum allowable error value may access a single stored value through maximum error index 78.

Transmission priority value 80 indicates a priority identified with cells associated with virtual channel number 60 relative to priorities associated with other virtual channel numbers in scheduling ring 32. The present invention facilitates prioritization of various types of data according to their respective transmission requirements. Signals associated with different qualities of service have different characteristics and place different demands on a transmission system.

For example, packets supporting constant bit rate (CBR) signals, such as video signals, require a continuous flow of data transmitted at a constant rate. CBR signals tolerate little deviation in transmission rate before the quality of the signal degrades. CBR signals, thus, receive a high priority relative to other types of signals. Other types of signals, such as, available bit rate (ABR), typically involve bursty traffic patterns. ABR signals generally involve sporadic transmission of blocks of cells. ABR allows greater flexibility as to the timing of transmission. Consequently, ABR signals may receive a lower transmission priority designation than, for example, CBR signals.

System 10 may provide various levels of granularity of priority associated with various types of signals being serviced. In the illustrated embodiment, transmission priority 80 may assume one of four values: "high" priority, "medium" priority, "low" priority, and "unoccupied." In this embodiment, constant bit rate signals receive a high priority, variable bit rate signals receive a medium priority designation, and efficient bit rate and ABR signals are designated as low priority.

Unoccupied slots receive the lowest transmission priority designation. Assigning a priority level to each virtual channel scheduled in scheduling ring 32 facilitates displacement and reorganization of the transmission schedule to ensure that the transmission of high priority events will occur in a timely manner. Specifying a transmission priority for virtual channels associated with various types of data also provides an advantage of maintaining an efficient transmission distribution among various qualities of service.

Inter-cell gap 82 represents a desired number of slots in scheduling ring 32 between the transmission of consecutive cells of a single packet. In the illustrated embodiment, inter-cell gap 82 comprises a floating point number including an inter-cell gap exponent (ICG-EXP) 84 and an inter-cell gap mantissa (ICG-MANTISSA) 86. Inter-cell gap 82 is useful in determining the value of transmission error 74. For example, by comparing the desired value of inter-cell gap 82 with a previous value of the inter-cell gap (calculated with reference to last-time value 64), a transmission error may be determined. Using floating point mathematics allows system 10 to track fractional transmission errors. This provides an advantage of increased accuracy in the calculation of transmission error 74. In this embodiment, transmission error 74 comprises the mantissa of a floating point value of the transmission error. Transmission error 74 shares the exponent value from ICG-EXP 84 for calculation purposes. Alternatively, Transmission error 74 could include its own exponent value.

In the illustrated embodiment, system 10 is operable to track errors as small as one part per million. Other levels of granularity may be achieved by changing the size of the mantissa fields associated with inter-cell gap 82 and transmission error 74 of system 10. Providing a fine level of granularity assists system 10 in maintaining a transmission rate that is very close to the ideal rate, which eliminates any need for separate resynchronization functionality within system 10.

Figure 4:
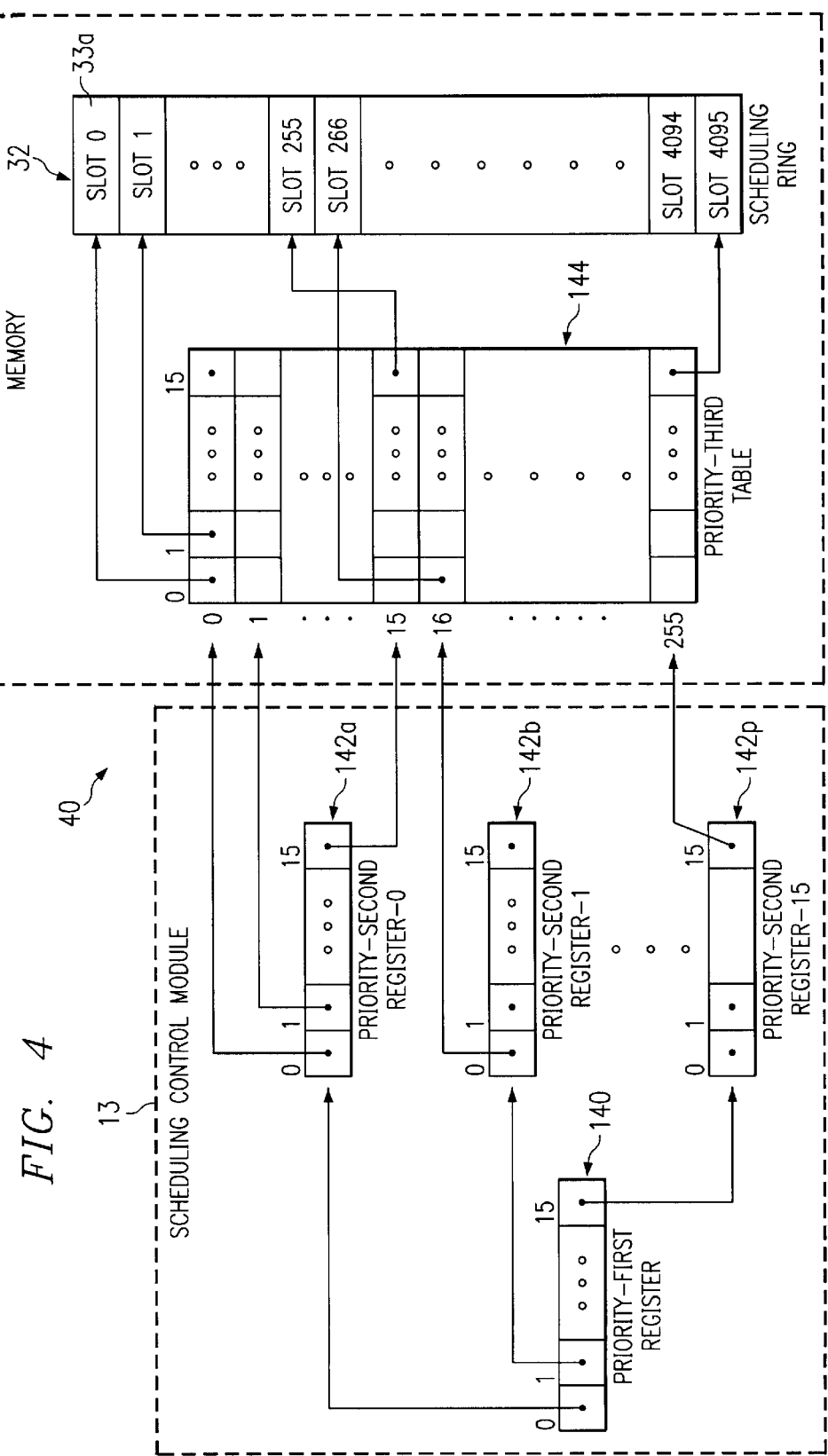
FIG. 4 is a block diagram of a priority map constructed according to the teachings of the present invention.

FIG. 4 is a block diagram of priority map 40 useful in identifying a closest-to-ideal scheduling/rescheduling slot once scheduler 24 has identified an ideal slot. The following description of the structure of priority map 40 is only one example of a data structure for storing and comparing transmission priorities associated with various virtual channels scheduled in scheduling ring 32. Other data structures, arrangements, and correlations may be used without departing from the intended scope of the invention.

In the illustrated embodiment, priority map 40 comprises a three-level, sixteen-way tree structure. The first (highest) level of priority map 40 comprises a priority-first register 140. In this embodiment, priority-first register 140 resides on the same chip as scheduling control module 13 and comprises a thirty-two bit register including sixteen two-bit entries. The second level of priority map 40 comprises sixteen priority-second registers 142a–142p, each having sixteen two-bit entries. Priority-second registers 142a–142p also reside on-chip along with scheduling control module 13. The third (lowest) level of priority map 40 comprises a two hundred fifty-six (256) by thirty-two-bit priority table 144, which resides in memory 30. Each row of priority table 144 comprises sixteen two-bit entries. Although the illustrated embodiment shows priority-first and priority-second registers 140 and 142a–142p residing on-chip and priority table 144 residing in memory 30, any combination of on-chip and memory-based data structures may be used without departing from the scope of the invention.

Each entry of priority map 40 consists of a two-bit field holding the value of the lowest transmission priority associated with the entries of the next lowest level associated with that entry. The lowest level fields (in priority table 144) are directly associated with the 4096 entries of scheduling ring 32. For example, entry zero of priority-first register 140 holds the value of the lowest transmission priority stored within priority-second register 142a; node zero of priority-second register 142a, in turn, holds the value of the lowest transmission priority stored within row zero of priority table 144; row zero of priority table 144 holds transmission priority values for slots zero through 15 of scheduling ring 32.

Priority map 40 allows scheduler 24 to quickly locate the slot 33, which is closest to an ideal scheduling or rescheduling slot, without methodically traversing every slot of scheduling ring 32. Details of how scheduler 24 traverses priority map 40 will be explained below.

FIGS. 5a–5d are flow charts showing an exemplary method of scheduling and rescheduling transmission of cells according to the teachings of the present invention. The method includes a section 200 (FIG. 5a) describing the overall operation of system 10; a section 220 (FIG. 5b) for receiving a scheduling request; a section 240 (FIGS. 5c and 5d) for scheduling the transmission of a first cell 17a of a packet 15; and a section 300 (FIG. 5e) for rescheduling the transmission of an additional cell 17b from a previously scheduled packet.

Figure 5A:
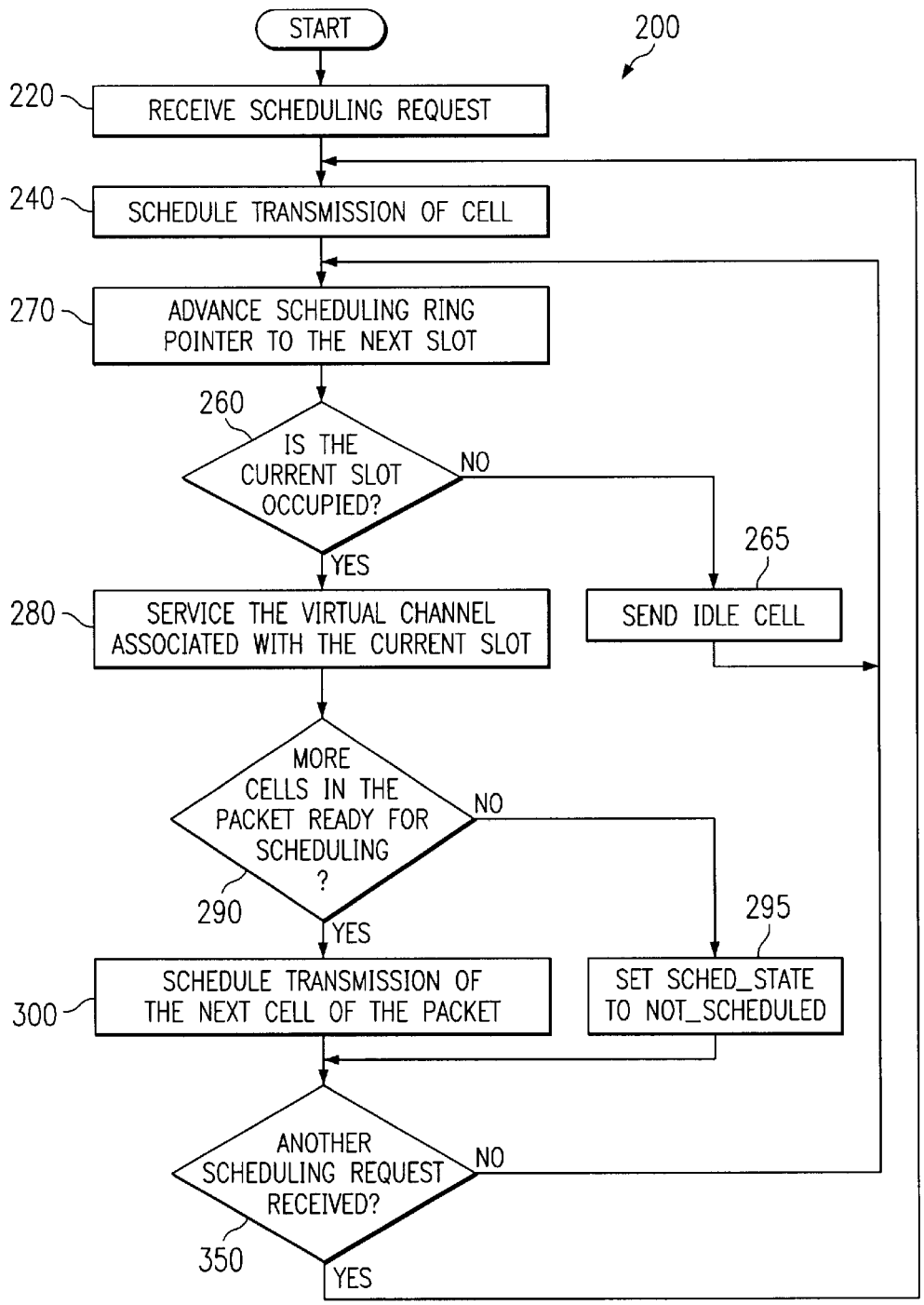

FIG. 5a is a flow chart illustrating an overall method of scheduling and rescheduling cells of various packets. This example assumes that scheduling ring 32 is at least partially filled with scheduled virtual channels, and explains one method of scheduling transmission of a first cell of a previously unscheduled first packet, as well as a method of rescheduling transmission of a cell of a previously scheduled second packet.

The method begins at step 220, where scheduler 24 receives a scheduling request to schedule transmission of a cell of a previously unscheduled first packet. Details of the generation of this scheduling request will be explained in connection with FIG. 5b. Scheduling module 26 proceeds to schedule the transmission of the cell at step 240 based at least in part on inter-cell gap 82 and transmission priority 80 associated with the first packet. Details of the scheduling method will be explained in connection with FIGS. 5c and 5d.

Scheduler 24 next checks whether the current slot (i.e., the slot that scheduling ring pointer 34 is pointing to) is occupied at step 260. If the current slot is not occupied, scheduler 24 may send an idle cell to the transmission queue at step 265, and advance scheduling ring pointer 34 to the next slot 33 in scheduling ring 32 at step 270. Scheduler 24 continues to advance scheduling pointer 34 until an occupied slot is encountered. Once scheduler 24 encounters an occupied slot, data mover 44 services the virtual channel associated with that slot at step 280. This empties the slot.

Scheduler 24 checks whether there is another cell associated with the virtual channel currently being serviced, which is ready for rescheduling at step 290. If scheduler 24 determines that another cell is ready for rescheduling at step 290, rescheduling module 28 proceeds to reschedule transmission of the cell at step 300. Details of the rescheduling method will be explained in connection with FIG. 5e.

During this time, scheduler 24 also remains ready to receive scheduling requests for other packets from controller 22 at step 350. If there are no other cells ready for rescheduling at step 290, and scheduler 24 receives a scheduling request at step 350, scheduler 24 proceeds to the scheduling process at step 240. If there are no other cells ready for rescheduling at step 290, and there is no packet awaiting scheduling at step 350, scheduler 24 advances scheduling ring pointer 34 to the next slot 33 in scheduling ring 32 at step 270, where data mover 44 will service the virtual channel associated with that slot at step 280.

Scheduling ring pointer 34 continues to advance around scheduling ring 32, and data mover 44 services each virtual channel associated with the current slot 33 as scheduling ring pointer 34 arrives at that slot 33. Scheduler 24 constantly reorganizes scheduling ring 32 as cells are scheduled, rescheduled, and serviced.

FIG. 5b is a flow chart showing additional details of an exemplary method of generating and receiving a scheduling request. Controller 22 initiates the scheduling process by retrieving individual control requests 18 from host memory 12 at step 222. As each control request 18 is fetched, it is filtered for validity and copied into a local control block 19 within memory 30 at step 224. As each control request is stored in local control block 19 of memory 30, it is linked into a chain attached to the virtual channel record 38 of the virtual channel to which each control request 18 is associated. Multiple control requests 18 may be transferred in a burst from host memory 12 by controller 22 to maximize bus band-width efficiency.

As control requests are linked onto each virtual channel-record chain in local control block 19, buffer byte counts are accumulated and stored in an associated virtual channel-record 38 at step 226. When the accumulated byte count for a buffer is at least that of one cell, controller 22 designates the associated virtual channel as ready for scheduling at step 228 and initiates a scheduling request to scheduler 26 at step 230.

Figure 5D:
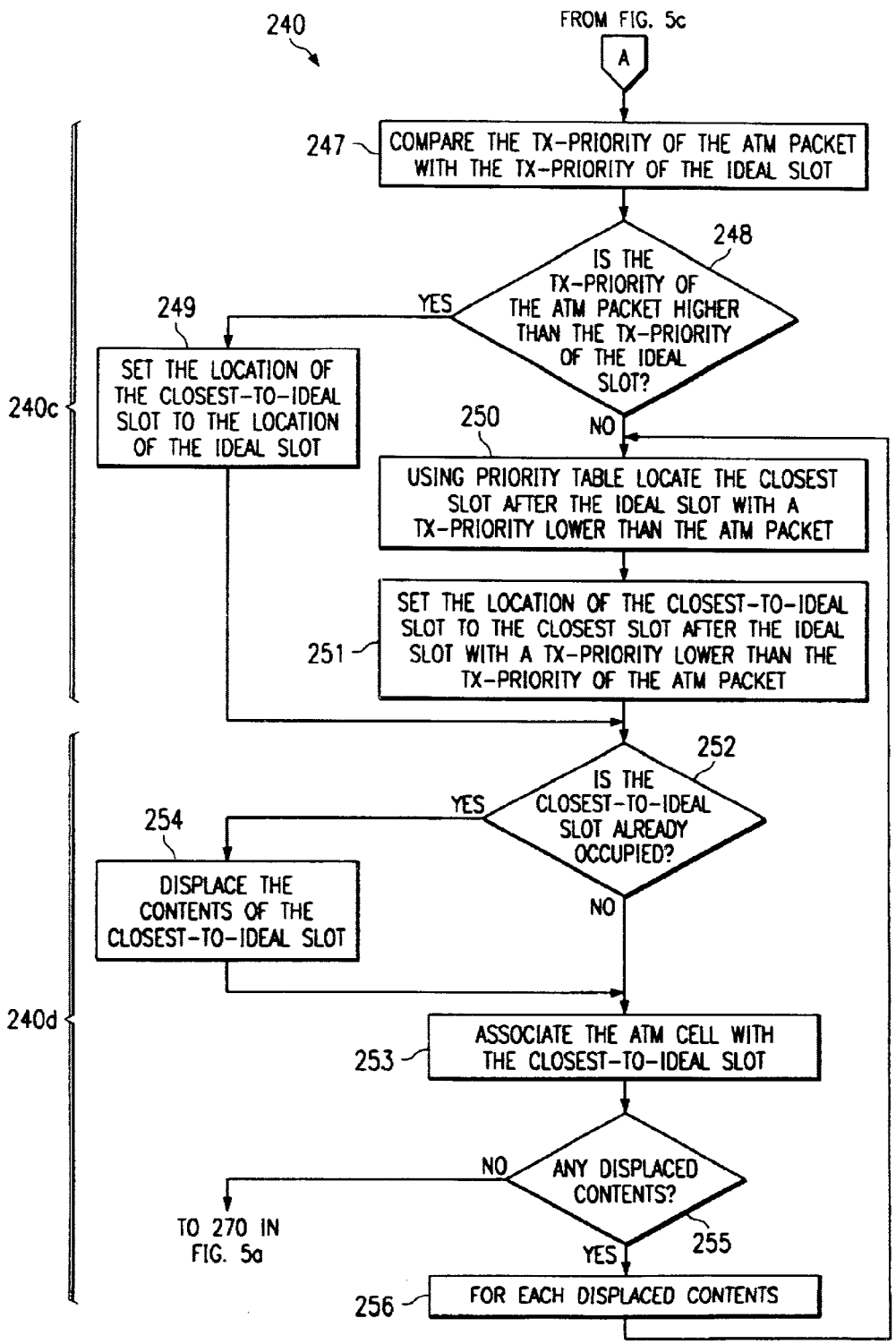

FIGS. 5c and 5d are flow charts showing additional details of an exemplary method 240 for scheduling transmission of a cell of a previously unscheduled packet.

The method generally comprises determining that a cell from the VCN to be scheduled is not already in the scheduling ring 32 at steps 240a, identifying an ideal scheduling slot at step 240b, identifying a closest-to-ideal scheduling slot at steps 240c, and inserting a scheduling request into scheduling ring 32 at the closest-to-ideal scheduling slot at steps 240d (FIG. 5d).

The scheduling process begins in steps 240a by first determining that there is no cell from a previous scheduling or rescheduling operation that belongs to the same VCN as the new cell to be scheduled and is still in scheduling ring 32. In the illustrated embodiment, there may only be at most one cell belonging to a particular VCN in the scheduling ring at any one time. A variable SCHED_STATE 88 (FIG. 3), which is associated with each VCN is used to indicate whether a VCN has a cell in the scheduling ring or not. The SCHED_STATE variable may hold the values NOT_SCHEDULED, SCHEDULED, or NEWLY_SCHEDULED. In step 238 SCHED_STATE is checked and if it is set to NOT_SCHEDULED, then SCHED_STATE is set to NEWLY_SCHEDULED in step 239 and the scheduling operation proceeds.

The method 240b of identifying an ideal scheduling slot begins at step 241, where scheduling module 26 accesses alias detector 42 to determine whether the current scheduling event involves a potential alias condition, thus, signaling scheduling module 26 to invalidate next-time 76 associated with the virtual channel corresponding to that slot.

In the illustrated embodiment, the location of the next-available slot for scheduling (and consequently the ideal scheduling slot) is determined, at least in part, by the value of next-time 76. Next-time 76 determines the earliest possible slot in which a particular virtual channel may be scheduled to insure that the first cell of the virtual channel being scheduled does not follow too closely behind transmission of the last cell of the previously-transmitted packet on the same virtual channel it follows. The location of the slot 33 corresponding to next-time 76 is defined relative to the position of scheduling ring pointer 34 at the time next-time 76 was stored (i.e., at the time that slot was previously scheduled/rescheduled).

Because the illustrated embodiment implements a circular list in scheduling ring 32, and because scheduling ring pointer 34 can uniquely identify only a finite number of slot locations, it is desirable to keep track of the number of revolutions scheduling ring pointer 34 has made around scheduling ring 32 since next-time 76 associated with slot 33 was stored. In this embodiment, scheduling ring 32 uses short-age value 62 to keep track of up to sixteen revolutions of scheduling ring pointer 34. When scheduling module 26 initially performs a scheduling or rescheduling operation, it sets short-age value 62 associated with that slot to a value of three. Each time scheduling ring pointer 34 makes a full revolution around scheduling ring 32, the short-age value 62 associated with every fourth slot is decremented by one.

For example, on a particular revolution around scheduling ring 32, scheduler 24 decrements the short age value 62 of slots "0," "4," "18," etc. by one; on the next revolution, short-age 62 of slots "1," "5," "9," etc. are decremented by one; on the third revolution, short-age 62 of slots "2," "6," "10," etc. are decremented by one; and on the fourth revolution short-age 62 of slots "3," "7," "11," etc. are decremented by one. A short-age value 62 of zero is not decremented. After twelve revolutions of scheduling ring pointer 34, short-age value 62 of any slot that has been scheduled but not serviced for the entire twelve revolutions is set to zero. A short-age value of zero instructs scheduler 24 to disregard the stored next-time 76 and use an arbitrary large default value instead.

Scheduler 24 defines the "next-available" slot as the closest slot 33 to the current slot in scheduling ring 32 in which a new packet may be scheduled. In a scheduling operation, the next-available slot may be determined by comparing the current slot location to a valid next-time value 76. Next-time value 76 is validated using sort-age value 68.

As previously discussed alias detector 42 determines whether there is a potential alias condition at step 241 by examining short-age value 62 associated with that slot. If short-age 62 is zero, alias detector 42 instructs scheduling module 26 to disregard any stored next-time 76 and identify the next-available scheduling slot as the current slot at step 242. If, however, alias detector 42 has not detected an alias condition (i.e., short-age value 62 does not equal zero) at step 241, scheduling module 26 identifies the next-available scheduling slot as the slot corresponding to next-time 76.

Scheduling module 26 next compares the location of the current slot (i.e., the slot that scheduling ring pointer 34 is currently pointing to) to the location of the next-available scheduling slot at step 243. If scheduling module 26 determines that the current slot is already at or beyond the position of the next-available scheduling slot at step 244, scheduling module 26 sets the ideal slot location to the location of the current slot at step 245. If, on the other hand, scheduling module 26 determines at step 244 that the position of the current slot is not beyond the position of the next-available scheduling slot, scheduling module 26 sets the location of the ideal slot to correspond to the location of the next-available scheduling slot at step 246.

Once the ideal scheduling slot is identified at steps 240b, scheduling module 26 proceeds to identify a closest-to-ideal scheduling slot by comparing at step 247 the transmission priority 80 associated with the previously unscheduled packet to the transmission priority associated with the identified ideal scheduling slot, which is stored in priority map 40. If scheduling module 26 determines at step 248 that the transmission priority associated with the packet is higher than the transmission priority associated with the ideal scheduling slot, scheduling module 26 sets the location of the closest-to-ideal scheduling slot to correspond with the location of the ideal scheduling slot at step 249. The transmission priority associated with the ideal scheduling slot may be lower than the transmission priority associated with the packet because, for example, the ideal scheduling slot is currently unoccupied, or because the packet previously associated with the ideal scheduling slot comprises a quality of service having a lower priority than packet sought to be scheduled.

If, on the other hand, scheduling module 26 determines at step 248 that the transmission priority associated with the previously unscheduled packet is equal to or lower than a transmission priority associated with the ideal scheduling slot, scheduling module 26 must locate the next closest slot after the ideal scheduling slot having a transmission priority lower than the transmission priority associated with the packet at step 250. From the previous description it can be appreciated that the closest-to-ideal scheduling slot may share the same location as the ideal scheduling slot, or may comprise a slot residing after the ideal scheduling slot, depending on the relative transmission priorities associated with the packet being scheduled and the ideal scheduling slot.

Scheduling module 26 locates the closest-to-ideal scheduling slot using priority map 40. To illustrate an exemplary method of traversing priority map 40 to locate the closest-to-ideal scheduling slot, a brief example will be given. Assume that scheduling ring pointer 34 currently points to slot 564 (which, in hexadecimal is 234, denoted 0x234) and that the ideal scheduling slot (determined with reference to next-time 76) is at slot 872 (0x368). Further assume that the transmission priority associated with the packet 15a desired to be scheduled is "medium" (priority 2). Scheduling module 26 wants to insert an entry for the virtual channel address associated with the cell being scheduled into scheduling ring 32 at the ideal scheduling slot (0x368), or as soon after that point as possible.

To accomplish this, the slot address of the ideal scheduling slot (0x368) is broken into its component nibbles in order to index the 3 levels of priority map 40. First, priority-first register 140 is indexed according to the most significant nibble. In this example, the most significant nibble of the ideal scheduling slot (0x368) is "3," which causes scheduling module 26 to index the fourth field of priority-first register 140.

Each entry in priority-first register 140 corresponds to one-sixteenth of scheduling ring 32. For example, the fourth entry corresponds to slots 768 through 1023 of scheduling ring 32. Each field of priority-first register 140 holds the lowest priority associated with any slot residing within the associated sixteenth of scheduling ring 32, where "01" represents high priority, "10" represents medium priority, "11" represents low priority, and "00" means the slot is not occupied. If, in this example, the fourth field holds a "10" or "01," that means that all slots from address 0x300 through 0x3ff are occupied with "high" or "medium" priority channels that have already been scheduled. In that case, no slots within field three are available for scheduling, and scheduling module 26 checks the next field (field "4") in priority-first register 140. In the worst case, this could continue until all 16 fields of priority-first register 140 have been checked, in order, wrapping around to field "0" after field "15," and ending up at field "2." Note that in this example, because there are as many slots in scheduling ring 32 as the maximum number of VCNs, there must always be at least one empty slot during a scheduling or rescheduling operation.

If, instead, the third field of priority-first register 140 contains a "00" (indicating an unoccupied slot) or a "11" (indicating a low priority slot), then there is at least one entry in the range 0x300 through 0x3ff that is unoccupied or has a lower transmission priority than the cell being scheduled. In that case, the next lower level of priority map 40 is examined, using the most significant two nibbles ("3" and "6") of the ideal scheduling slot address to index the starting point. In this case, the seventh field within the fourth priority-second register 140c is examined first. If this field holds a "10" (indicating "high" priority) or a "01" (indicating "medium" priority), that means that all slots from address 0x360 through 0x36f are already occupied with "high" or "medium" priority channels already scheduled. In that case, the next field (field "7") in third priority-second register 140c would be examined.

In the worst case, this could continue until all fields "7" through "15" have been checked (not wrapping around to check fields "0" through "5" because these represent transmission slot times earlier than the ideal transmission time.) If none of the fields "7" through "15" contain an unoccupied or low priority slot, then scheduling module 26 must go back to the top level (priority-first register 140) and find the next "unoccupied" or "low" priority field in priority-first to register 140.

Scheduling module 26 continues this algorithm until it locates the closest slot 33 within scheduling ring 32 at or after the ideal scheduling slot. The best case traversal of this algorithm is a traversal of priority-first register 140, a traversal of one of priority-second registers 142a–142p, and traversal of one row of priority-third table 144. In the exemplary system, this requires two register reads and one SRAM read access. Updating priority map 40 and scheduling ring 32 requires an additional two register writes and two SRAM write accesses. The worst case traversal of this algorithm is a traversal from the top of priority map 40 (priority-first register 140) to a row within priority-third table 144, back to the top of priority map 40, and down to another row within priority-third table 144. In the exemplary system, this would require five register reads and two SRAM read accesses. Updating priority map 40 and scheduling ring 32 requires and additional two register writes and two SRAM write accesses.

Referring again to FIG. 5c, once scheduling module 26 has located the closest slot 33 to the ideal slot having a transmission priority lower than the transmission priority 80 associated with the cell being scheduled at step 250, scheduling module 26 sets the location of the closest-to-ideal slot to the identified location at step 251. If scheduling module 26 determines that the identified closest-to-ideal slot is unoccupied at step 252, scheduler 26 proceeds to associate the virtual channel address corresponding to that cell with the identified closest-to-ideal slot at step 253. If, on the other hand, scheduling module 26 determines at step 252 that closest-to-ideal slot is already occupied by a previously scheduled virtual channel address associated with a lower transmission priority, scheduling module 26 displaces the lower priority contents of closest-to-ideal slot at step 254, and associates the cell being scheduled with that slot at step 253.

If any lower priority contents have been displaced at step 255, scheduling module 26 reinserts the displaced contents into scheduling ring 32 at step 256. Scheduling module 26 replaces the displaced contents using priority map 40 to identify the next closest slot in scheduling ring 32 having a transmission priority lower than the transmission priority associated with the displaced contents at step 250. Scheduling module 26 continues this process until all displaced contents have been reinserted into scheduling ring 32. Because each virtual channel number may appear at most once in scheduling ring 32, there will always be room to replace displaced contents.

FIG. 5e is a flow chart showing an exemplary method 300 for rescheduling transmission of a cell of a previously scheduled packet. The method generally comprises identifying an ideal rescheduling slot at step 300a, identifying a closest-to-ideal rescheduling slot at step 300b, and inserting a rescheduling request into scheduling ring 32 at the closest-to-ideal rescheduling slot at step 300c.

As previously explained, scheduling ring pointer 34 advances around scheduling ring 32, servicing virtual channels associated with the current slot 33 (i.e., the slot scheduling ring pointer 34 is currently pointing to). Each time scheduling ring pointer 34 advances to a new slot, data mover 44 services the virtual channel associated with that slot by attending to transmission of the scheduled cell associated with that slot and, if necessary, rescheduling transmission of another cell from the same packet. In determining whether to reschedule transmission of another cell from the same packet, scheduler 24 checks whether there is another cell of the packet ready for rescheduling at step 290. If another cell from the same packet is ready for rescheduling at step 290, rescheduling module 28 proceeds to reschedule transmission of second cell 17b at step 300.

Upon receiving a rescheduling request at step 300, rescheduling module 28 checks transmit-early mode indicator 70 (stored in virtual channel index table 36) at step 302 to determine whether to operate in a transmit-early mode. Transmission standards for various qualities of service typically specify average and peak allowable transmission rates. The transmit-early mode is a method of aggressively interpreting transmission standards to maximize transmission efficiency. As previously explained, the transmission rate for each packet 15 is determined, at least in part, by the inter-cell gap associated with each packet. This transmission rate may be adjusted to compensate for transmission delays accumulated during transmission of previously scheduled cells.

System 10 may operate in a transmit-early mode to adjust the inter-cell gap associated with particular packets 15 by a predefined transmission error credit. In the illustrated embodiment, the amount of error credit is equal to the maximum error allowed to accumulate with respect to that particular packet 15. By granting this transmission error credit, before any transmission error has actually accrued, system 10 may operate to get a head start on transmission of packets 15 having particular qualities of service. For example, ABR signals may comprise only a few cells of data, which could be transmitted at an accelerated rate, without exceeding the defined peak transmission rate. The transmit-early mode provides an advantage of aggressively transmitting cells supporting particular qualities of service, which are amenable to transmitting at an accelerated rate without exceeding the defined peak rate.

In the illustrated embodiment, transmit-early mode indicator 70 comprises a single bit. If at step 302 rescheduling module 28 determines that transmit-early mode is active, and if SCHED_STATE variable 88 is set to NEWLY_SCHEDULED, then it sets the value of transmission error 74 equal to a maximum error value associated with packet 15. Otherwise, transmission error 74 retains its accumulated value from any transmission error actually incurred. System 10 could give any appropriate transmission error credit. Allotting the full maximum error credit is only one example of a method of operating in a transmit-early mode. SCHED_STATE variable 88 is set to SCHEDULED at step 305.

Rescheduling module 28 next calculates the value of the next inter-cell gap (next-ICG) at step 306. The value of the next inter-cell gap determines a minimum number of slots beyond the current slot in which the second cell 17B may be scheduled for transmission. The next inter-cell gap value is calculated by adjusting the desired inter-cell gap 82 by the transmission error 74. If system 10 is operating in transmit-early mode and SCHED_STATE is set to NEWLY_SCHEDULED, transmission error 74 is automatically set to the maximum error value at step 304. If system 10 is not operating in transmit-early mode or SCHED_STATE is already set to SCHEDULED, transmit-error value 74 is calculated as the difference between the desired inter-cell gap 82 (stored in virtual channel record 38 associated with packet 15) and the last value of the inter-cell gap. In either case, however, the transmission error is limited to the maximum allowable error value associated with packet 15. The last value of the inter-cell gap is calculated as the difference between the current position of scheduling ring pointer 34 and the last-time value 64 associated with the current slot.

Last-time value 64 comprises the location of scheduling ring pointer 34 the last time the virtual channel associated with the current slot was scheduled or rescheduled. Scheduler 24 may check the integrity of last-time value 64 with alias detector 42. Like next-time 76 discussed previously, last-time value 64 comprises a location in scheduling ring 32 that must be interpreted with reference to the number of times scheduling ring pointer 34 has encircled the ring. Alias detector 42 can track the number of rotations by scheduling ring pointer 34 and invalidate last-time value 64 after a certain number of rotations. If last-time value 64 is invalidated, rescheduling module 28 may use a default value for last-time value 64.

As an example of calculating the next inter-cell gap, assume scheduler 24 performed a scheduling operation with respect to a cell from a first packet at slot "10," and is now ready to perform a rescheduling operation on a second cell from the same packet at current slot "50" of scheduling ring 32. The actual inter-cell gap value is calculated as the difference between the current position of scheduling ring pointer 34 ("50") and last-time value 64 ("10"); or "50"–"10"="40" slots. Assume that the desired inter-cell gap 82 associated with packet 15a was "30" slots. The transmission error 74 incurred since the initial scheduling operation is the difference between the desired inter-cell gap 82 and the actual inter-cell gap; in this case, "30" slots –"40" slots=–10 slots. In other words, in this example system 10 is ten transmission slots late in transmitting the second cell.

Continuing with this example, the next inter-cell gap is calculated at step 306 by adjusting the desired inter-cell gap value 82 by the transmission error incurred since the last scheduling/rescheduling event (or the maximum error, whichever is smaller). In this example, assume that the maximum error value associated with packet 15 is "–8" slots. The next inter-cell gap value would be the calculated desired inter-cell gap 82+MIN (transmission error 74, maximum error); in this case, transmission error 74 is limited by the maximum error ("8" slots), so the next inter-cell gap would be "30"–"8"="22" slots.

The present invention provides an advantage of facilitating increased accuracy in calculating the next inter-cell gap and transmission error by using floating point mathematics. By using floating point mathematics, system 10 can track fractional transmission errors, thus improving the accuracy of the resulting average transmission rate. For example, system 10 may incur a transmission error of 3.754 slots and calculate a value of 26.246 slots for the next inter-cell gap value. The ideal transmission slot will be chosen by rounding up to the next integer and adding this value to the current slot value, for example 50+27=slot 77. The remaining transmission error of –0.754 slots in this example would then carry over and figure into calculations performed when the next cell from the same packet is subsequently scheduled.

Once rescheduling module 28 has calculated the next inter-cell gap value at step 306, it compares the calculated value to predefined minimum inter-cell gap value associated with packet 15 at step 308. Each packet 15 has an associated minimum inter-cell gap, which defines a peak transmission rate to ensure that system 10 does not overwhelm receivers of the signals being transmitted. If rescheduling module 28 determines at step 308 that the calculated next inter-cell gap value is smaller than the minimum allowable inter-cell gap 68 at step 308, rescheduling module 28 sets the value of the next inter-cell gap equal to the minimum inter-cell gap value 68 at step 310.

In keeping with the previous example, the next inter-cell gap value was calculated as "22" slots. If, for example, the minimum inter-cell gap 68 associated with packet 15a was "25" slots, scheduling module 26 would set the next inter-cell gap value to "25" instead of "22" at step 310. Rescheduling module 28 then proceeds to locate an ideal rescheduling slot according to the next inter-cell gap value at step 312. In this example, assuming scheduling ring pointer 34 is currently pointing at slot "50", the ideal rescheduling slot would be "25" slots later at slot "75."

Once the ideal rescheduling slot has been identified at step 300a, rescheduling module 28 proceeds to identify a closest-to-ideal rescheduling slot in light of the transmission priority associated with the second cell at step 300b. Rescheduling module 28 begins by comparing the transmission priority associated with second cell to transmission priority 80 associated with the identified ideal rescheduling slot at step 314.

If rescheduling module 28 determines at step 316 that the transmission priority associated with the second cell is higher than the transmission priority 80 associated with the ideal rescheduling slot, rescheduling module 28 sets the location of the closest-to-ideal rescheduling slot to correspond to the location of the ideal rescheduling slot at step 318. If, on the other hand, rescheduling module 28 determines at step 316 that the transmission priority associated with the second cell is equal to or lower than transmission priority 80 associated with ideal rescheduling slot, rescheduling module 28 proceeds to locate the next closest slot after the ideal rescheduling slot, which has a transmission priority lower than the transmission priority associated with the second cell at step 320.

Rescheduling module 28 locates the closest-to-ideal rescheduling slot using priority map 40. The method of locating the closes-to-ideal rescheduling slot is similar to, and may be identical to, the method 240b for locating a closet-to-ideal scheduling slot. As previously explained with reference to scheduling module 26, rescheduling module 28 indexes priority map 40 using the hexadecimal address of ideal rescheduling slot 33h. Rescheduling module 28 traverses priority map 40 until it finds the closest slot 33 after the ideal rescheduling slot having a transmission priority 82 lower than the transmission priority associated with the second cell. Rescheduling module 28 sets the location of the closest-to-ideal slot to the identified slot at step 322.

Method 300c is a method for inserting a rescheduling request into the closest-to-ideal rescheduling slot, and reorganizing scheduling ring 32 in light of the insertion. Method 300c begins at step 324 where rescheduling module 28 determines whether the closest-to-ideal rescheduling slot is already occupied. If the closest-to-ideal rescheduling slot is already occupied, rescheduling module 28 displaces the contents of the slot at step 328. Note that these contents must have a lower transmission priority than the second cell, because the closest-to-ideal slot is defined as a slot having a transmission priority lower than the cell to be scheduled. Once the closest-to-ideal rescheduling slot is available, either because it was never occupied or because the lower priority contents have been displaced, rescheduling module 28 associates the second cell with the closest-to-ideal rescheduling slot at step 326.

If any lower priority contents were displaced at step 328, scheduler 24 reinserts the displaced contents at step 332. Scheduler 24 reinserts the displaced contents using priority map 40 to identify the next closest slot in scheduling ring 32 having a transmission priority 80 lower than the transmission priority associated with the displaced contents at step 320. Scheduler 24 continues this process until all displaced contents have been replaced in scheduling ring 32. Because each virtual channel number may appear at most once in scheduling ring 32, there will always be room to replace displaced contents. The present invention provides an advantage of maintaining transmission characteristics associated with displaced contents (such as short-age value 64, transmission error 74, etc.) even after the displaced contents are reinserted into scheduling ring 32.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method of scheduling transmission of a plurality of cells of a first signal packet associated with a first virtual channel address using a scheduling ring having a plurality of slots and a pointer operable to indicate a current slot, the method comprising:

advancing the pointer to a slot associated with the first virtual channel address;

initiating transmission of a previously scheduled first cell associated with the first virtual channel address;

scheduling transmission of a previously unscheduled second cell associated with the first virtual channel address for transmission at a later time, wherein scheduling transmission of the previously unscheduled second cell comprises:

identifying an ideal scheduling slot in the scheduling ring, a position of the ideal scheduling slot based at least in part on a desired value of an inter-cell gap and a transmission error associated with the first signal packet, the transmission error comprising a difference between a desired value of the inter-cell gap and a last value of the inter-cell gap, the last value of the inter-cell gap comprising a difference between the slot currently being serviced and the slot associated with a previously serviced cell of the first signal packet;

identifying a closest-to-ideal scheduling slot in the scheduling ring comprising the closest slot at or after the ideal scheduling slot having a transmission priority lower than a transmission priority associated with the first signal packet; and associating the first virtual channel address with the closest-to-ideal scheduling slot in the transmission schedule; and advancing the pointer to the next slot.

2. The method of claim 1, wherein initiating transmission of the scheduled cell comprises:

retrieving the first cell of the first signal packet; and placing the first cell of the first signal packet onto a transmission queue.

3. The method of claim 1, wherein the desired inter-cell gap and the transmission error comprise floating point numbers.

4. The method of claim 1, wherein identifying an ideal scheduling slot comprises:

determining a next inter-cell gap using the desired inter-cell gap and the transmission error; and identifying as the ideal scheduling slot a slot positioned beyond the current slot by a number of slots equal to the next inter-cell gap.

5. The method of claim 1, wherein identifying the closest-to-ideal scheduling slot comprises:

identifying the closest-to-ideal scheduling slot as the ideal scheduling slot if the transmission priority of the first signal packet is higher than the transmission priority associated with the ideal scheduling slot; and identifying the closest-to-ideal scheduling slot as the next slot after the ideal scheduling slot having a lower transmission priority than the transmission priority of the first signal packet if the transmission priority of the first signal packet is equal or lower than the transmission priority associated with the ideal scheduling slot.

6. The method of claim 1, further comprising:

displacing the contents of the closest-to-ideal scheduling slot;

reinserting the displaced contents of the closest-to-ideal scheduling slot in the next slot having a lower transmission priority than the priority associated with the displaced contents; and repeatedly reinserting displaced contents into the scheduling ring according to their priorities until all displaced contents are placed into the scheduling ring.

7. The method of claim 1, further comprising:

determining a quality of service associated with the first signal packet; and allocating an amount of transmission error credit according to the quality of service associated with the signal packet.

8. The method of claim 1, further comprising:

receiving a scheduling request to schedule transmission of a previously unscheduled first cell of a second signal packet associated with the first virtual channel address; and scheduling transmission of the first cell of the second signal packet.

9. The method of claim 8, wherein scheduling transmission of the first cell of the second signal packet comprises:

identifying an ideal scheduling slot in the scheduling ring based at least in part on an inter-cell gap associated with the second signal packet; and identifying a closest-to-ideal scheduling slot in the scheduling ring comprising the closest slot at or after the ideal scheduling slot having a transmission priority lower than a transmission priority associated with the second signal packet; and associating the first cell of the second signal packet with the closest-to-ideal scheduling slot.

10. The method of claim 9, wherein identifying the ideal scheduling slot comprises:

identifying a next-available scheduling slot based at least in part on a desired value of the inter-cell gap associated with the second signal packet;

identifying the next-available scheduling slot as the ideal scheduling slot if the next-available scheduling slot is beyond the current slot; and identifying the current slot as the ideal scheduling slot if the next-available scheduling slot is not beyond the current slot.

11. The method of claim 9, wherein identifying the ideal scheduling slot comprises:

identifying a potential alias condition in the transmission schedule; and identifying the current scheduling slot as the ideal scheduling slot in response to identifying the potential alias condition.

12. The method of claim 9, wherein identifying the closest-to-ideal scheduling slot comprises:

identifying the closest-to-ideal scheduling slot as the ideal scheduling slot if the transmission priority of the second signal packet is higher than the transmission priority associated with the ideal scheduling slot; and identifying the closest-to-ideal scheduling slot as the next slot after the ideal scheduling slot having a lower transmission priority than the transmission priority of the second signal packet if the transmission priority of the second signal packet is equal to or lower than the transmission priority associated with the ideal scheduling slot.

13. The method of claim 9, further comprising:

displacing the contents of the closest-to-ideal scheduling slot;

reinserting the displaced contents of the closest-to-ideal scheduling slot in the next slot having a lower transmission priority than the priority associated with the displaced contents; and repeatedly reinserting displaced contents into the scheduling ring according to their priorities until all displaced contents are placed into the scheduling ring.

14. The method of claim 1, further comprising:

determining a quality of service associated with the first signal packet; and allocating an amount of transmission error credit according to the quality of service associated with the first signal packet.

15. The method of claim 1, wherein the first cell and the second cell are both associated with the first signal packet.

16. An integrated circuit operable to schedule transmission of a plurality of signal packets, comprising:

a controller operable to receive control requests from a host memory and to generate scheduling requests based on the control requests received;

a scheduling ring comprising a plurality of slots and a pointer operable to indicate a current slot; and a scheduler operable to advance the pointer to a slot associated with a first virtual channel address, to initiate transmission of a previously scheduled first cell of a signal packet associated with the first virtual channel address, and to schedule transmission of a previously unscheduled second cell of the signal packet for transmission at a later time;

wherein the scheduler comprises a scheduling module operable to identify an ideal scheduling slot in the scheduling ring based at least in part on a desired inter-cell gap and a transmission error associated with the first signal packet, and to identify a closest-to-ideal scheduling slot in the scheduling ring comprising the closest slot at or after the ideal scheduling slot having a transmission priority lower than a transmission priority associated with the signal packet, the scheduling module further operable to associate the first virtual channel address with the closest-to-ideal scheduling slot;

wherein the transmission error comprises a difference between a desired value of the inter-cell gap and a last value of the inter-cell gap, the last value of the inter-cell gap comprising a difference between the slot currently being serviced and the slot associated with a previously serviced cell of the first signal packet.

17. The integrated circuit of claim 16, wherein the scheduling ring comprises a memory containing the first virtual channel address and transmission characteristics including a desired inter-cell gap, a transmission priority, and a transmission error associated with the signal packet.

18. The integrated circuit of claim 17, wherein the memory comprises a next inter-cell gap comprising a sum of the desired inter-cell gap and the transmission error and wherein the scheduler operates to identify the ideal scheduling slot as a slot positioned beyond the current slot by a number of slots equal to the next inter-cell gap.

19. The integrated circuit of claim 17, wherein the memory comprises a transmit-early indicator operable to indicate whether the transmission error will initially be allocated a transmission error credit.

20. The integrated circuit of claim 16, wherein the scheduler comprises a scheduling ring reorganizer operable to:

displace the contents of the closest-to-ideal scheduling slot;

identify a replacement slot comprising the next slot after to the closest-to-ideal scheduling slot having a lower transmission priority than the displaced contents;

displace the contents of the replacement slot, if any;

reinsert the displaced contents of the closest-to-ideal scheduling slot into the replacement slot; and repeatedly reinsert displaced contents into the scheduling ring according to their priorities until all displaced contents are placed into the scheduling ring.

21. The integrated circuit of claim 16, wherein the scheduler comprises an alias detector operable to identify a potential alias condition in the transmission schedule, and in response to identifying the potential alias condition, to identify the current scheduling slot as the ideal scheduling slot.

22. The integrated circuit of claim 16, wherein the scheduler comprises a scheduling ring reorganizer operable to:

displace the contents of the closest-to-ideal scheduling slot;

identify a replacement slot comprising the next slot after to the closest-to-ideal scheduling slot having a lower transmission priority than the displaced contents;

displace the contents of the replacement slot, if any;

reinsert the displaced contents of the closest-to-ideal scheduling slot into the replacement slot; and repeatedly reinsert displaced contents into the scheduling ring according to their priorities until all displaced contents are placed into the scheduling ring.

23. The integrated circuit of claim 16, wherein the desired inter-cell gap and the transmission error comprise floating point numbers.

24. The integrated circuit of claim 16, further comprising a priority map comprising a collection of transmission priorities associated with the slots of the scheduling ring, wherein the scheduler is operable to access the priority map to identify a closest-to-ideal slot based on a known position of an ideal slot and a transmission priority associated with the signal packet, the closest-to-ideal slot comprising the closest slot at or after the ideal slot having a transmission priority lower than the transmission priority associated with the signal packet.

25. The integrated circuit of claim 24, wherein the priority map comprises:

a priority table comprising a plurality of entries, each entry corresponding to a slot of the scheduling ring and containing a transmission priority associated with the corresponding slot;

a plurality of priority-second registers, each priority-second register comprising a plurality of entries, each entry corresponding to a subset of slots in the scheduling ring and containing the lowest transmission priority associated with any of that entry's corresponding subset of slots; and a priority-first register comprising a plurality of entries, each entry corresponding to one of the plurality of priority-second registers and containing the lowest transmission priority associated with any entry in the corresponding priority-second register.

26. A system for traffic shaping the transmission of a plurality of signal packets, comprising:

a scheduling ring comprising a plurality of slots and a pointer operable to indicate a current slot; and a scheduler operable to advance the pointer to a slot associated with a first virtual channel address, to initiate transmission of a previously scheduled first cell of a signal packet associated with the first virtual channel address, and to schedule transmission of a previously unscheduled second cell of the signal packet for transmission at a later time;

wherein the scheduler comprises a scheduling module operable to identify an ideal scheduling slot in the scheduling ring based at least in part on the desired inter-cell gap and a transmission error associated with the signal packet, and to identify a closest-to-ideal scheduling slot in the scheduling ring comprising the closest slot at or after the ideal scheduling slot having a transmission priority lower than a transmission priority associated with the signal packet, the scheduling module further operable to associate the first virtual channel address with the closest-to-ideal scheduling slot;

wherein the transmission error comprises a difference between a desired value of the inter-cell gap and a last value of the inter-cell gap, the last value of the inter-cell gap comprising a difference between the slot currently being serviced and the slot associated with a previously serviced cell of the first signal packet.

27. The system of claim 26, wherein the scheduling ring comprises a memory containing the first virtual channel address and transmission characteristics including a desired inter-cell gap, a transmission priority, and a transmission error associated with the signal packet.

28. The integrated circuit of claim 27, wherein the desired inter-cell gap and the transmission error comprise floating point numbers.

29. The system of claim 26, wherein the scheduler comprises a scheduling ring reorganizer operable to:
   displace the contents of the closest-to-ideal scheduling slot;
   identify a replacement slot comprising the next slot after to the closest-to-ideal scheduling slot having a lower transmission priority than the displaced contents;
   displace the contents of the replacement slot, if any;
   reinsert the displaced contents of the closest-to-ideal scheduling slot into the replacement slot; and
   repeatedly reinsert displaced contents into the scheduling ring according to their priorities until all displaced contents are placed into the scheduling ring.

30. The system of claim 26, wherein the scheduler comprises an alias detector operable to identify a potential alias condition in the transmission schedule, and in response to identifying the potential alias condition, to identify the current scheduling slot as the ideal scheduling slot.

31. The system of claim 26, wherein the scheduler comprises a scheduling ring reorganizer operable to:
   displace the contents of the closest-to-ideal scheduling slot;
   identify a replacement slot comprising the next slot after to the closest-to-ideal scheduling slot having a lower transmission priority than the displaced contents;
   displace the contents of the replacement slot, if any;
   reinsert the displaced contents of the closest-to-ideal scheduling slot into the replacement slot; and
   repeatedly reinsert displaced contents into the scheduling ring according to their priorities until all displaced contents arc placed into the scheduling ring.

32. The system of claim 26, further comprising a priority map comprising a collection of transmission priorities associated with the slots of the scheduling ring, wherein the scheduler is operable to access the priority map to identify a closest-to-ideal slot based on a known position of an ideal slot and a transmission priority associated with the signal packet, the closest-to-ideal slot comprising the closest slot at or after the ideal slot having a transmission priority lower than the transmission priority associated with the signal packet.

33. The system of claim 32, wherein the priority map comprises:
   a priority table comprising a plurality of entries, each entry corresponding to a slot of the scheduling ring and containing a transmission priority associated with the corresponding slot;
   a plurality of priority-second registers, each priority-second register comprising a plurality of entries, each entry corresponding to a subset of slots in the scheduling ring and containing the lowest transmission priority associated with any of that entry's corresponding subset of slots; and
   a priority-first register comprising a plurality of entries, each entry corresponding to one of the plurality of priority-second registers and containing the lowest transmission priority associated with any entry in the corresponding priority-second register.

34. A method of scheduling transmission of a plurality of cells associated with a first virtual channel address using a scheduling ring having a plurality of slots, the method comprising:
   advancing a pointer to a first slot of the scheduling ring associated with the first virtual channel address, wherein each slot of the scheduling ring is associated with at most one virtual channel address at any given time;
   initiating transmission of a previously scheduled first cell associated with the first virtual channel address;
   scheduling transmission of a previously unscheduled second cell associated with the first virtual channel address, the scheduling comprising:
      identifying an ideal scheduling slot in the scheduling ring, a position of the ideal scheduling slot based at least in part on a desired value of an inter-cell gap and a transmission error associated with the first signal packet, the transmission error comprising a difference between a desired value of the inter-cell gap and a last value of the inter-cell gap, the last value of the inter-cell gap comprising a difference between the slot currently being serviced and the slot associated with a previously serviced cell of the first signal packet; and
      associating the first virtual channel address with a slot other than the first slot in the scheduling ring.

35. The method of claim 34, wherein the first cell and the second cell are both associated with the same packet.

36. The method of claim 34, wherein scheduling transmission of the previously unscheduled second cell comprises:
   identifying a closest-to-ideal scheduling slot in the scheduling ring comprising the closest slot at or after the ideal scheduling slot having a transmission priority lower than a transmission priority associated with the first signal packet; and
   associating the first virtual channel address with the closest-to-ideal scheduling slot in the transmission schedule.

37. A system for traffic shaping the transmission of a plurality of signal packets, comprising:
   a scheduling ring comprising a plurality of slots and a pointer operable to indicate a current slot; and
   a scheduler operable to advance the pointer to a slot associated with a first virtual channel address, to initiate transmission of a previously scheduled first cell associated with the first virtual channel address, and to schedule transmission at a later time of a previously unscheduled second cell associated with the first virtual channel address;

wherein the scheduler comprises a scheduling module operable to identify an ideal scheduling slot in the scheduling ring based at least in part on the desired inter-cell gap and a transmission error associated with the second cell, the transmission error comprising a difference between a desired value of the inter-cell gap and a last value of the inter-cell gap, the last value of the inter-cell gap comprising a difference between the slot currently being serviced and the slot associated with a previously serviced cell of the first signal packet; and wherein each slot of the scheduling ring is associated with at most one virtual channel address at any given time, and wherein scheduling transmission of the second cell comprises associating the first virtual channel address with a slot other than the first slot in the scheduling ring.

38. The system of claim 37, wherein the scheduling module is operable to identify a closest-to-ideal scheduling slot in the scheduling ring comprising the closest slot at or after the ideal scheduling slot having a transmission priority lower than a transmission priority associated with the signal packet, the scheduling module further operable to associate the first virtual channel address with the closest-to-ideal scheduling slot.

39. The system of claim 37, wherein both the first cell and the second cell are associated with the same signal packet.

40. A method of scheduling transmission of a plurality of cells associated with a first virtual channel address using a scheduling ring having a plurality of slots, the method comprising:

advancing a pointer to a first slot associated with the first virtual channel address, initiating transmission of a previously scheduled first cell associated with the first virtual channel address;

determining whether a previously unscheduled second cell associated with the first virtual channel address is ready to be transmitted;

scheduling transmission of the second cell associated with the first virtual channel address only if the second cell is ready to be transmitted, wherein scheduling transmission of the second cell comprises identifying an ideal scheduling slot in the scheduling ring, a position of the ideal scheduling slot based at least in part on a desired value of an inter-cell gap and a transmission error associated with the first signal packet, the transmission error comprising a difference between a desired value of the inter-cell gap and a last value of the inter-cell gap, the last value of the inter-cell gap comprising a difference between the slot currently being serviced and the slot associated with a previously serviced cell of the first signal packet.

41. The method of claim 40, wherein the first cell and the second cell are both associated with the same packet.

42. The method of claim 40, wherein scheduling transmission of the second cell comprises:

identifying a closest-to-ideal scheduling slot in the scheduling ring comprising the closest slot at or after the ideal scheduling slot having a transmission priority lower than a transmission priority associated with the first signal packet; and associating the first virtual channel address with the closest-to-ideal scheduling slot in the transmission schedule.

43. A system for traffic shaping the transmission of a plurality of signal packets, comprising:

a scheduling ring comprising a plurality of slots and a pointer operable to indicate a current slot; and a scheduler operable to advance the pointer to a slot associated with a first virtual channel address, and to initiate transmission of a previously scheduled first cell associated with the first virtual channel address, wherein the scheduler is further operable to determine whether a second cell associated with the first virtual channel address is ready for transmission, and to schedule transmission of the second cell only if the second cell is ready for transmission, wherein the scheduler comprises a scheduling module operable to identify an ideal scheduling slot in the scheduling ring based at least in part on the desired inter-cell gap and a transmission error associated with the second cell, the transmission error comprising a difference between a desired value of the inter-cell gap and a last value of the inter-cell gap, the last value of the inter-cell gap comprising a difference between the slot currently being serviced and the slot associated with a previously serviced cell of the first signal packet.

44. The system of claim 43, wherein the scheduling module is operable to identify a closest-to-ideal scheduling slot in the scheduling ring comprising the closest slot at or after the ideal scheduling slot having a transmission priority lower than a transmission priority associated with the signal packet, the scheduling module further operable to associate the first virtual channel address with the closest-to-ideal scheduling slot.

* * * * *